US012094476B2

(12) United States Patent
Ward et al.

(10) Patent No.: US 12,094,476 B2
(45) Date of Patent: Sep. 17, 2024

(54) SYSTEMS, METHODS AND APPARATUS FOR CONVERSION FROM CHANNEL-BASED AUDIO TO OBJECT-BASED AUDIO

(71) Applicants: DOLBY LABORATORIES LICENSING CORPORATION, San Francisco, CA (US); DOLBY INTERNATIONAL AB, Amsterdam (NL)

(72) Inventors: Michael C. Ward, Orinda, CA (US); Freddie Sanchez, Berkeley, CA (US); Christof Joseph Fersch, Neumarkt (DE)

(73) Assignees: DOLBY LABORATORIES LICENSING CORPORATION, San Francisco, CA (US); DOLBY INTERNATIONAL AB, Dublin (IE)

( * ) Notice: Subject to any disclaimer, the term of this patent is extended or adjusted under 35 U.S.C. 154(b) by 196 days.

(21) Appl. No.: 17/781,978

(22) PCT Filed: Dec. 2, 2020

(86) PCT No.: PCT/US2020/062873
§ 371 (c)(1),
(2) Date: Jun. 2, 2022

(87) PCT Pub. No.: WO2021/113350
PCT Pub. Date: Jun. 10, 2021

(65) Prior Publication Data

US 2023/0024873 A1 Jan. 26, 2023

Related U.S. Application Data

(60) Provisional application No. 62/942,322, filed on Dec. 2, 2019.

(30) Foreign Application Priority Data

Dec. 2, 2019 (EP) .................................... 19212906

(51) Int. Cl.
*G10L 19/00* (2013.01)
*G10L 19/16* (2013.01)

(52) U.S. Cl.
CPC ................................. *G10L 19/167* (2013.01)

(58) Field of Classification Search
CPC .................................................... G10L 19/167
See application file for complete search history.

(56) References Cited

U.S. PATENT DOCUMENTS 9,313,576 B2 4/2016 Kim
9,338,420 B2 5/2016 Pei
(Continued)

FOREIGN PATENT DOCUMENTS

CN 101689368 B 8/2012
CN 101632118 B 6/2013
(Continued)

OTHER PUBLICATIONS

ETSI TS 103 420 v1.2.1 "Backwards-Compatible Object Audio Carriage Using Enhanced AC-3" (Oct. 2018).
(Continued)

*Primary Examiner* — Ibrahim Siddo

(57) ABSTRACT

Embodiments are disclosed for channel-based audio (CBA) (e.g., 22.2-ch audio) to object-based audio (OBA) conversion. The conversion includes converting CBA metadata to object audio metadata (OAMD) and reordering the CBA channels based on channel shuffle information derived in accordance with channel ordering constraints of the OAMD. The OBA with reordered channels is rendered in a playback device using the OAMD or in a source device, such as a set-top box or audio/video recorder. In an embodiment, the (Continued)

| | FL | FR | FC | LFE1 | BL | BR | FLc | FRc | BC | LFE2 | SIL |
|---|---|---|---|---|---|---|---|---|---|---|---|
| dmix_pos_adj_idx = 0 | OBJECT: [0,0.25,0] | OBJECT: [1,0.25,0] | C | LFE | Lrs | Rrs | L | R | OBJECT: [0.5,1,0] | LFE2 | Ls |
| dmix_pos_adj_idx = 1 | L | R | C | LFE | Lrs | Rrs | OBJECT: [0.25,0,0] | OBJECT: [0.75,0,0] | OBJECT: [0.5,1,0] | LFE2 | Ls |

| SIR | TpFL | TpFR | TpFC | TpC | TpBL | TpBR | TpSIL | TpSIR | TpBC | BtFL | BtFR | BtFC |
|---|---|---|---|---|---|---|---|---|---|---|---|---|
| Rs | Lvh | Rvh | OBJECT: [0.5,0,1] | OBJECT: [0.5,0.5,1] | Lrh | Rrh | Lts | Rts | OBJECT: [0.5,1,1] | OBJECT: [0,0,-1] | OBJECT: [1,0,-1] | OBJECT: [0.5,0,-1] |
| Rs | Lvh | Rvh | OBJECT: [0.5,0,1] | OBJECT: [0.5,0.5,1] | Lrh | Rrh | Lts | Rts | OBJECT: [0.5,1,1] | OBJECT: [0,0,-1] | OBJECT: [1,0,-1] | OBJECT: [0.5,0,-1] |

| | OUTPUT CHANNEL ORDER INDEX (BED CHANNEL ASSIGNMENT LABEL) | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 22.2 (ASSUMED ORDER) | 0 (FL) | 1 (FR) | 2 (FC) | 3 (LFE1) | 4 (BL) | 5 (BR) | 6 (FLc) | 7 (FRc) | 8 (BC) | 9 (LFE2) | 10 (SiL) | 11 (SiR) |
| OAMD (dmix_pos_adj_idx = 0) | 6 (L) | 7 (R) | 2 (C) | 3 (LFE) | 10 (Ls) | 11 (Rs) | 4 (Lrs) | 5 (Rrs) | 12 (Lfh) | 13 (Rfh) | 18 (Ltm) | 19 (Rtm) |
| OAMD (dmix_pos_adj_idx = 1) | 0 (L) | 1 (R) | 2 (C) | 3 (LFE) | 10 (Ls) | 11 (Rs) | 4 (Lrs) | 5 (Rrs) | 12 (Lfh) | 13 (Rfh) | 18 (Ltm) | 19 (Rtm) |

| 12 | 13 | 14 | 15 | 16 | 17 | 18 | 19 | 20 | 21 | 22 | 23 |
|---|---|---|---|---|---|---|---|---|---|---|---|
| 12 (TpFL) | 13 (TpFR) | 14 (TpFC) | 15 (TpC) | 16 (TpBL) | 17 (TpBR) | 18 (TpSiL) | 19 (TpSiR) | 20 (TpBC) | 21 (BtFL) | 22 (BtFR) | 23 (BtFC) |
| 16 (Lrh) | 17 (Rrh) | 9 (LFE2) | 0 (dObj FL) | 1 (dObj FR) | 8 (dObj BC) | 14 (dObj TpFC) | 15 (dObj TpC) | 20 (dObj TpBC) | 21 (dObj BtFL) | 22 (dObj BtFR) | 23 (dObj BtFC) |
| 16 (Lrh) | 17 (Rrh) | 9 (LFE2) | 6 (dObj FLc) | 7 (dObj FRc) | 8 (dObj BC) | 14 (dObj TpFC) | 16 (dObj TpC) | 20 (dObj TpBC) | 21 (dObj BtFL) | 22 (dObj BtFR) | 23 (dObj BtFC) |

CBA metadata includes signaling that indicates a specific OAMD representation to be used in the conversion of the metadata. In an embodiment, pre-computed OAMD is transmitted in a native audio bitstream (e.g., AAC) for transmission (e.g., over HDMI) or for rendering in a source device. In an embodiment, pre-computed OAMD is transmitted in a transport layer bitstream (e.g., ISO BMFF, MPEG4 audio bitstream) to a playback device or source device.

30 Claims, 16 Drawing Sheets

(56) References Cited

U.S. PATENT DOCUMENTS

| | | | |
|---|---|---|---|
| 9,622,014 | B2 | 4/2017 | Chabanne |
| 9,866,985 | B2 | 1/2018 | Shi |
| 9,934,790 | B2 | 4/2018 | Baumgarte |
| 9,947,326 | B2 | 4/2018 | Ghido |
| 9,992,600 | B2 | 6/2018 | Mateos Sole |
| 10,136,240 | B2 | 11/2018 | De Burgh |
| 10,192,563 | B2 | 1/2019 | Fueg |
| 10,244,343 | B2 | 3/2019 | Tsingos |
| 10,251,007 | B2 | 4/2019 | Torres |
| 10,257,638 | B2 | 4/2019 | Van Brandenburg |
| 10,271,156 | B2 | 4/2019 | Song |
| 10,332,532 | B2 | 6/2019 | Seo |
| 2015/0146873 | A1 | 5/2015 | Chabanne |
| 2016/0163321 | A1 * | 6/2016 | Arnott .................. G10L 19/167 704/500 |
| 2016/0212559 | A1 | 7/2016 | Mateos Sole |
| 2017/0032801 | A1 | 2/2017 | Baumgarte |
| 2017/0374484 | A1 * | 12/2017 | Lando .................. G10L 19/008 |
| 2018/0288553 | A1 | 10/2018 | Lee |
| 2018/0357038 | A1 | 12/2018 | Olivieri |
| 2019/0005968 | A1 | 1/2019 | Ichimura |

FOREIGN PATENT DOCUMENTS

| | | | |
|---|---|---|---|
| CN | 105612577 | B | 10/2019 |
| CN | 106688251 | B | 10/2019 |
| RU | 2564681 | C2 | 10/2015 |
| WO | 2013006338 | A2 | 1/2013 |
| WO | 2016138168 | A1 | 9/2016 |
| WO | 2017058731 | A1 | 4/2017 |

OTHER PUBLICATIONS

ISO/IEC 14496-3 "Information Technology—Coding of Audio-Visual Objects" Part 3 Audio, Sep. 1, 2009.

ISO/IEC 23003-3, "Information Technology—MPEG Audio Technologies, Unified Speech and Audio Coding" Apr. 1, 2012.

* cited by examiner

| | FL | FR | FC | LFE1 | BL | BR | FLc | FRc | BC | LFE2 | SiL |
|---|---|---|---|---|---|---|---|---|---|---|---|
| dmix_pos_adj_idx = 0 | OBJECT: [0,0.25,0] | OBJECT: [1,0.25,0] | C | LFE | Lrs | Rrs | L | R | OBJECT: [0.5,1,0] | LFE2 | Ls |
| dmix_pos_adj_idx = 1 | L | R | C | LFE | Lrs | Rrs | OBJECT: [0.25,0,0] | OBJECT: [0.75,0,0] | OBJECT: [0.5,1,0] | LFE2 | Ls |

| | SiR | TpFL | TpFR | TpFC | TpC | TpBL | TpBR | TpSiL | TpSiR | TpBC | BtFL | BtFR | BtFC |
|---|---|---|---|---|---|---|---|---|---|---|---|---|---|
| dmix_pos_adj_idx = 0 | Rs | Lvh | Rvh | OBJECT: [0.5,0,1] | OBJECT: [0.5,0.5,1] | Lrh | Rrh | Lts | Rts | OBJECT: [0.5,1,1] | OBJECT: [0,0,-1] | OBJECT: [1,0,-1] | OBJECT: [0.5,0,-1] |
| dmix_pos_adj_idx = 1 | Rs | Lvh | Rvh | OBJECT: [0.5,0,1] | OBJECT: [0.5,0.5,1] | Lrh | Rrh | Lts | Rts | OBJECT: [0.5,1,1] | OBJECT: [0,0,-1] | OBJECT: [1,0,-1] | OBJECT: [0.5,0,-1] |

FIG. 1A

OUTPUT CHANNEL ORDER INDEX (BED CHANNEL ASSIGNMENT LABEL)

| | 0 | 1 | 2 | 3 | 4 | 5 | 6 | 7 | 8 | 9 | 10 | 11 |
|---|---|---|---|---|---|---|---|---|---|---|---|---|
| 22.2 (ASSUMED ORDER) | 0 (FL) | 1 (FR) | 2 (FC) | 3 (LFE1) | 4 (BL) | 5 (BR) | 6 (FLc) | 7 (FRc) | 8 (BC) | 9 (LFE2) | 10 (SiL) | 11 (SiR) |
| OAMD (dmix_pos_adj_idx = 0) | 6 (L) | 7 (R) | 2 (C) | 3 (LFE) | 10 (Ls) | 11 (Rs) | 4 (Lrs) | 5 (Rrs) | 12 (Lfh) | 13 (Rfh) | 18 (Ltm) | 19 (Rtm) |
| OAMD (dmix_pos_adj_idx = 1) | 0 (L) | 1 (R) | 2 (C) | 3 (LFE) | 10 (Ls) | 11 (Rs) | 4 (Lrs) | 5 (Rrs) | 12 (Lfh) | 13 (Rfh) | 18 (Ltm) | 19 (Rtm) |

| | 12 | 13 | 14 | 15 | 16 | 17 | 18 | 19 | 20 | 21 | 22 | 23 |
|---|---|---|---|---|---|---|---|---|---|---|---|---|
| 22.2 (ASSUMED ORDER) | 12 (TpFL) | 13 (TpFR) | 14 (TpFC) | 15 (TpC) | 16 (TpBL) | 17 (TpBR) | 18 (TpSiL) | 19 (TpSiR) | 20 (TpBC) | 21 (BtFL) | 22 (BtFR) | 23 (BtFC) |
| OAMD (dmix_pos_adj_idx = 0) | 16 (Lrh) | 17 (Rrh) | 9 (LFE2) | 0 (dObj FL) | 1 (dObj FR) | 8 (dObj BC) | 14 (dObj TpFC) | 15 (dObj TpC) | 20 (dObj TpBC) | 21 (dObj BtFL) | 22 (dObj BtFR) | 23 (dObj BtFC) |
| OAMD (dmix_pos_adj_idx = 1) | 16 (Lrh) | 17 (Rrh) | 9 (LFE2) | 6 (dObj FLc) | 7 (dObj FRc) | 8 (dObj BC) | 14 (dObj TpFC) | 15 (dObj TpC) | 20 (dObj TpBC) | 21 (dObj BtFL) | 22 (dObj BtFR) | 23 (dObj BtFC) |

FIG. 1B

| METADATA FIELD | VALUE | NOTES |
|---|---|---|
| warp_mode | 0 | INDICATES NORMAL RENDERING (i.e., NO WARPING) OF OBJECTS IN 5.1.X OUTPUT CONFIGURATIONS |
| PER-CONFIGURATION TRIMS/ BALANCE CONTROLS | SEE TABLE BELOW | |
| object_trim_bypass *(PER OBJECT)* | FALSE | VALUE APPLIES TO ALL BED AND DYNAMIC OBJECTS IN THE PRESENTATION |

FIG. 2A

| METADATA FIELD | OUTPUT CONFIGURATION (config_id) | | | | | | | | |
|---|---|---|---|---|---|---|---|---|---|
| | 2.0 (0) | 5.1.0 (1) | 7.1.0 (2) | 2.1.2 (3) | 5.1.2 (4) | 7.1.2 (5) | 2.1.4 (6) | 5.1.4 (7) | 7.1.4 (8) |
| auto_trim | FALSE | FALSE | FALSE | FALSE | FALSE | FALSE | FALSE | FALSE | FALSE |
| center_trim (dB) | 0 | 0 | 0 | 0 | 0 | 0 | 0 | 0 | 0 |
| surround_trim (dB) | -3 | 0 | 0 | -3 | 0 | 0 | -3 | 0 | 0 |
| height_trim (dB) | -3 | 0 | 0 | 0 | 0 | 0 | 0 | 0 | 0 |
| fb_balance_ohfl | 0.0 | 0.0 | 0.0 | 0.0 | 0.0 | 0.0 | 0.0 | 0.0 | 0.0 |
| fb_balance_surr | 0.0 | 0.0 | 0.0 | 0.0 | 0.0 | 0.0 | 0.0 | 0.0 | 0.0 |

FIG. 2B

SYSTEMS, METHODS AND APPARATUS FOR CONVERSION FROM CHANNEL-BASED AUDIO TO OBJECT-BASED AUDIO

CROSS-REFERENCE TO RELATED APPLICATIONS

This application claims priority of U.S. Provisional Patent Application No. 62/942,322, filed Dec. 2, 2019, and EP Patent Application No. 19212906.2, filed Dec. 2, 2019, both of which are hereby incorporated by reference in their entireties.

TECHNICAL FIELD

This disclosure relates generally to audio signal processing, including channel-based audio to object-based audio conversion.

BACKGROUND

In channel-based audio (CBA) coding, a set of tracks is implicitly assigned to specific loudspeakers by associating the set of tracks with a channel configuration. If the playback speaker configuration is different from the coded channel configuration, downmixing or upmixing specifications are required to redistribute audio to the available speakers. This paradigm is well known and works when the channel configuration at the decoding end can be predetermined, or assumed with reasonable certainty to be 2.0, 5.X or 7.X. However, with the popularity of new speaker setups, no assumption can be made about the speaker setup used for playback. Therefore, CBA does not offer a sufficient method for adapting a representation where the source speaker layout does not match the speaker layout at the decoding end. This presents a challenge when trying to author content that plays back well independently to the speaker configuration.

In object-based audio (OBA) coding, rendering is applied to objects that comprise the object audio essence in conjunction with metadata that contains individually assigned object properties. The properties (e.g., x, y, z position or channel location) more explicitly specify how the content creator intends the audio content to be rendered (that is, they place constraints on how to render the essence into speakers). Because individual sound elements can be associated with a much richer set of metadata, giving meaning to the elements, the method of adaptation to the speaker configuration reproducing the audio can provide better information regarding how to render to fewer speakers.

There are several standardized formats for transmission of CBA content, such as enhanced AC-3 (E-AC-3) defined in ETSI TS 102 366 [1]. To ensure compatibility with pre-existing devices joint object coding (JOC) can be used in conjunction with standardized CBA formats to transport OBA. JOC delivers immersive audio at low bitrates, achieved by conveying a multi-channel downmix of the immersive content using perceptual audio coding algorithms together with parametric side information that enables the reconstruction of the audio objects from the downmix in the decoder. In some applications, such as television broadcasts, it is desired to represent CBA content as OBA content so that the content is compatible with an install base of OBA playback devices. However, the standardized bitstream formats for CBA and OBA are not entirely compatible.

SUMMARY

Embodiments are disclosed for converting CBA content to OBA content, and in particular embodiment converting 22.2-channel content to OBA content for playback on OBA compatible playback devices.

In an embodiment, a method comprises: receiving, by one or more processors of an audio processing apparatus, a bitstream including channel-based audio and associated channel-based audio metadata; the one or more processors configured to: parse a signaling parameter from the channel-based audio metadata, the signaling parameter indicating one of a plurality of different object audio metadata (OAMD) representations; each one of the OAMD representations mapping one or more audio channels of the channel-based audio to one or more audio objects; convert the channel-based metadata into OAMD associated with the one or more audio objects using the OAMD representation that is indicated by the signaling parameter; generate channel shuffle information based on channel ordering constraints of the OAMD; reorder the audio channels of the channel-based audio based on the channel shuffle information to generate reordered, channel-based audio; and render the reordered, channel-based audio into rendered audio using the OAMD; or encode the reordered channel-based audio and the OAMD into an object-based audio bitstream and transmit the object-based audio bitstream to a playback device or source device.

In an embodiment, the channel-based audio and metadata are included in a native audio bitstream, and the method further comprises decoding the native audio bitstream to recover (i.e. determine, or extract) the channel-based audio and metadata.

In an embodiment, the channel-based audio and metadata are N.M channel-based audio and metadata, where N is a positive integer greater than nine and M is a positive integer greater than or equal to zero.

In an embodiment, the method further comprises: determining a first set of channels of the channel-based audio that are capable of being represented by OAMD bed channels; assigning OAMD bed channel labels to the first set of channels; determining a second set of channels of the channel-based audio that are not capable of being represented by OAMD bed channels; and assigning static OAMD position coordinates to the second set of channels.

In embodiment, a method comprises: receiving, by one or more processors of an audio processing apparatus, a bitstream including channel-based audio and metadata; the one or more processors configured to: encode the channel-based audio into a native audio bitstream; parse a signaling parameter from the metadata, the signaling parameter indicating one of a plurality of different object audio metadata (OAMD) representations; convert the channel-based metadata into OAMD using the OAMD representation that is indicated by the signaling parameter; generate channel shuffle information based on channel ordering constraints of the OAMD; generate a bitstream package that includes the native audio bitstream, the channel shuffle information and the OAMD; multiplex the package into a transport layer bitstream; and transmit the transport layer bitstream to a playback device or source device.

In an embodiment, the channel-based audio and metadata are N.M channel-based audio and metadata, where N is a positive integer greater than seven and M is a positive integer greater than or equal to zero.

In an embodiment, the channels in the channel-based audio that can be represented by OAMD bed channel labels use the OAMD bed channel labels, and the channels in the channel-based audio that cannot be represented by OAMD bed channel labels use static object positions, where each static object position is described in OAMD position coordinates.

In an embodiment, the transport bitstream is a moving pictures experts group (MPEG) audio bitstream that includes a signal that indicates the presence of OAMD in an extension field of the MPEG audio bitstream.

In an embodiment, the signal that indicates the presence of OAMD in the MPEG audio bitstream is included in a reserved field of metadata in the MPEG audio bitstream for signaling a surround sound mode.

In an embodiment, a method comprises: receiving, by one or more processors of an audio processing apparatus, a transport layer bitstream including a package; the one or more processors configured to: demultiplex the transport layer bitstream to recover (i.e. determine or extract) the package; decode the package to recover (i.e. determine or extract) a native audio bitstream, channel shuffle information and an object audio metadata (OAMD); decode the native audio bitstream to recover a channel-based audio bitstream and metadata; reorder the channels of the channel-based audio based on the channel shuffle information; and render the reordered, channel-based audio into rendered audio using the OAMD; or encode the channel-based audio and OAMD into an object-based audio bitstream and transmit the object-based audio bitstream to a source device.

In an embodiment, the channel-based audio and metadata are N.M channel-based audio and metadata, where N is a positive integer greater than seven and M is a positive integer greater than or equal to zero.

In an embodiment, a method further comprises: determining a first set of channels of the channel-based audio that are capable of being represented by OAMD bed channels; assigning OAMD bed channel labels to the first set of channels; determining a second set of channels of the channel-based audio that are not capable of being represented by OAMD bed channels; and assigning static OAMD position coordinates to the second set of channels.

In an embodiment, the transport bitstream is a moving pictures experts group (MPEG) audio bitstream that includes a signal that indicates the presence of OAMD in an extension field of the MPEG audio bitstream.

In an embodiment, the signal that indicates the presence of OAMD in the MPEG audio bitstream is included in a reserved field of a data structure in metadata of the MPEG audio bitstream for signaling a surround sound mode.

In an embodiment, an apparatus comprises: one or more processors; and a non-transitory, computer-readable storage medium having instructions stored thereon that when executed by the one or more processors, cause the one or more processors to perform the methods described herein.

Other embodiments disclosed herein are directed to systems, apparatus and computer-readable media. The details of the disclosed implementations are set forth in the accompanying drawings and the description below. Other features, objects and advantages are apparent from the description, drawings and claims.

Particular embodiments disclosed herein provide one or more of the following advantages. An existing installed base of OBA compatible playback devices can convert CBA content to OBA content using existing standards-based native audio and transport bitstream formats without replacing hardware components of the playback devices.

DESCRIPTION OF DRAWINGS

In the accompanying drawings referenced below, various embodiments are illustrated in block diagrams, flow charts and other diagrams. Each block in the flowcharts or block may represent a module, a program, or a part of code, which contains one or more executable instructions for performing specified logic functions. Although these blocks are illustrated in particular sequences for performing the steps of the methods, they may not necessarily be performed strictly in accordance with the illustrated sequence. For example, they might be performed in reverse sequence or simultaneously, depending on the nature of the respective operations. It should also be noted that block diagrams and/or each block in the flowcharts and a combination of thereof may be implemented by a dedicated software-based or hardware-based system for performing specified functions/operations or by a combination of dedicated hardware and computer instructions.

FIG. 1A is a table showing bed channel and object positions for two different object audio metadata (OAMD) representations, according to an embodiment.

FIG. 1B is a table showing bed channel assignment and channel ordering for two different OAMD representations, according to an embodiment.

FIG. 2A is a table showing dimensional trim metadata, according to an embodiment.

FIG. 2B is a table showing trims/balance controls, according to an embodiment.

The same reference symbol used in various drawings indicates like elements.

DETAILED DESCRIPTION

Overview

Figure 3:
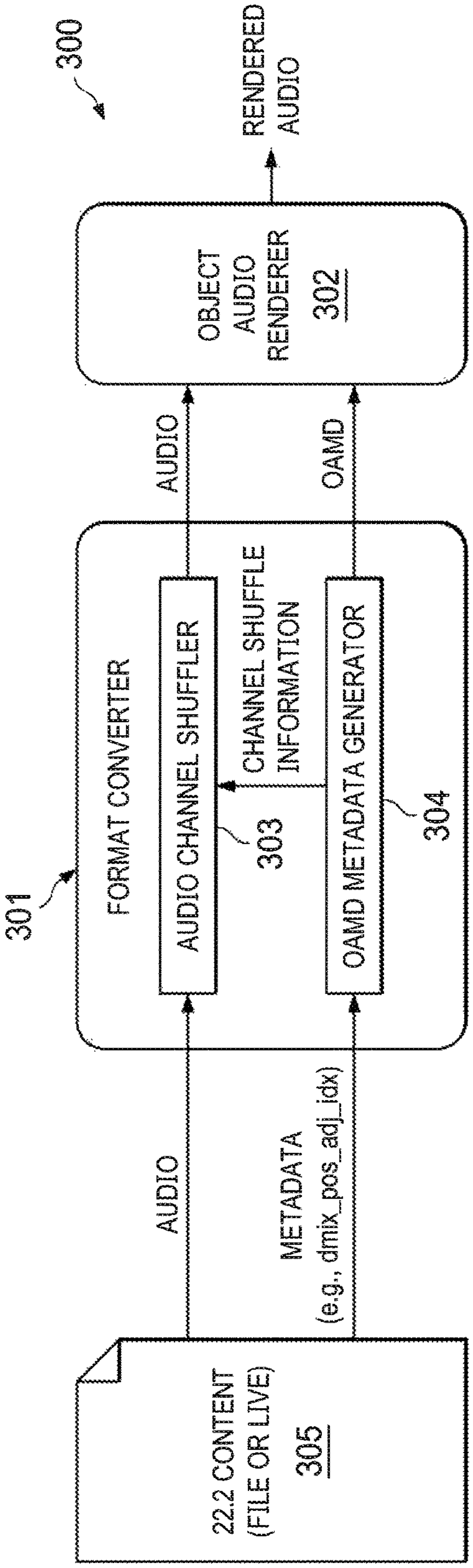
FIG. 3 is a block diagram of a system for converting a 22.2-ch audio bitstream into audio objects and OAMD without using bitstream encoding, according to an embodiment.

Object Audio Metadata (OAMD) is the coded bitstream representation of the metadata for OBA processing, such as for example, metadata described in ETSI TS 103 420 v1.2.1 (2018 October). The OAMD bitstream may be carried inside an Extensible Metadata Delivery Format (EMDF) container, such as, for example, as specified in ETSI TS 102 366 [1]. OAMD is used for rendering an audio object. The rendering information may dynamically change (e.g. gain and position). The OAMD bitstream elements may include content description metadata, object properties metadata, property update metadata and other metadata.

In an embodiment, the content description metadata includes the version of OAMD payload syntax, the total number of objects, the types of objects and the program composition. The object properties metadata includes object position in room-anchored, screen-anchored or speaker-anchored coordinates, object size (width, depth, height), priority (imposes an ordering by importance on objects where higher priority indicates higher importance for an object), gain (used to apply a custom gain value to an object), channel lock (used to constrain rendering of an object to a single speaker, providing a non-diffuse, timbre-neutral reproduction of the audio), zone constraints (specifies zones or sub-volume in the listening environment where an object is excluded or included), object divergence (used to convert object into two objects, where the energy is spread along the X-axis) and object trim (used to lower the level of out-of-screen elements that are indicated in the mix).

In an embodiment, the property update metadata signals timing data applicable to updates for all transmitted objects. The timing data of a transmitted property update specifies a start time for the update, along with the update context with preceding or subsequent updates and the temporal duration for an interpolation process between successive updates. The OAMD bitstream syntax supports up to eight property updates per object in each codec frame. The number of signaled updates or the start and stop time of each property update is identical for all objects. The metadata indicates the value of a ramp duration value in the OAMD that specifies a time period in audio samples for an interpolation from signaled object property values of the previous property update to values of the current update.

In an embodiment, the timing data also includes a sample offset value and a block offset value which are used by the decoder to calculate a start sample value offset and a frame offset. The sample offset is a temporal offset in samples to the first pulse code modulated (PCM) audio sample that the data in the OAMD payload applies to, such as, for example, as specified in ETSI TS 102 366 [1], clauses H.2.2.3.1 and H.2.2.3.2. The block offset value indicates a time period in samples as offset from the sample offset common for all property updates.

In an embodiment, a decoder provides an interface for the OBA comprising object audio essence audio data and time-stamped metadata updates for the corresponding object properties. At the interface the decoder provides the decoded per-object metadata in time stamped updates. For each update the decoder provides the data specified in a metadata update structure.

Exemplary CBA to OBA Conversion

In the following disclosure, techniques are disclosed for converting CBA content into OBA using OAMD. In an exemplary embodiment, 22.2-channel ("22.2-ch") content is converted to OBA using OAMD. In this embodiment, the 22.2-ch content has two defined methods by which channels are positioned and hence downmixed/rendered. The choice of method may be dependent on the value of a parameter, such as dmix_pos_adj_idx parameter embedded in the 22.2-ch bitstream. The format converter that converts 22.2-ch locations to an OAMD representation selects one of two OAMD representations based on the value of this parameter. The selected representation is carried in an OBA bitstream (e.g., Dolby® MAT bitstream) that is input to the playback device (e.g., a Dolby® Atmos® playback device). An example 22.2-ch system is Hamasaki 22.2. Hamasaki 22.2 is the surround sound component of Super Hi-Vision, which is a television standard developed by NHK Science & Technical Research Laboratories that uses 24 speakers (including two subwoofers) arranged in three layers.

Although the following disclosure is directed to an embodiment where 22.2-ch content is converted to OBA content using OAMD, the disclosed embodiments are applicable to any CBA or OBA bitstream format, including standardized or proprietary bitstream formats, and any playback device or system. Additionally, the following disclosure is not limited to 22.2-ch to OBA conversion but is also applicable to conversion of any N.M channel-based audio, where N is a positive integer greater than seven and M is a positive integer greater than or equal to zero.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an example embodiment" are to be read as "at least one example embodiment." The term "another embodiment" is to be read as "at least one other embodiment." In addition, in the following description and claims, unless defined otherwise, all technical and scientific terms used herein have the same meaning as commonly understood by one of ordinary skills in the art to which this disclosure belongs.

Program Assignment and Object Positions

In this application, 22.2-ch content 305 (e.g., a file or live stream) is received by format converter 301. The content 305 includes audio and associated metadata. The metadata includes the dmix_pos_adj_idx parameter for selecting one of two OAMD representations based on the value of this parameter. Channels that can be represented by OAMD bed channel labels use the OAMD bed channel labels. Channels that cannot be represented by OAMD bed channel labels use static object positions, where each static object position is described in OAMD [x, y, z] position coordinates, such as, for example, as described in ETSI TS 103 420 v1.2.1 (2018

October). As used herein, a "bed channel" is a group of multiple bed objects and a "bed object" is a static object whose spatial position is fixed by an assignment to a loudspeaker of a playback system.

FIG. 1A is a table showing bed channel and object positions for two different OAMD representations, according to an embodiment. The top row of the table includes the twenty-four 22.2-ch labels, the middle row of the table includes bed channel labels and object positions for a first OAMD representation, signaled by dmix_pos_adj_idx=0, and the bottom row of the table includes the bed channel labels and object positions for a second OAMD representation, signaled by dmix_pos_adj_idx=1. Note the dmix_pos_adj_idx signal is an example signal and any type of signaling can be used, including but not limited to Boolean flags and signals encoded with one or more bits.

Referring to the table in FIG. 1A, some examples of 22.2-ch labels include front-left (FL), front-right (FR), Front-center (RC), low-frequency effects 1 (LFE1), back-left (BL), back-right (BR), front-left-center (FLc), front-right-center (FRc), back-center (BC), low-frequency effects 2 (LFE2), left-side (SIL), right-side (SIR), top-front-left (TpFL), top-front-right (TpFR), top-front-center (TpFC), top-center (TpC), top-back-left (TpBL), top-back-right (TpBR), top-side-left (TpSIL), top-side-right (TpSIR), top-back-center (TpBC), between-front-left (BtFL), between-front-right (BtFR) and between-front-center (BtFC). Note that these labels are mapped to either OAMD bed channel labels or static object positions [x, y, z]. For example, for the first OAMD representation (dmix_pos_adj_idx=0), the 22.2-ch label FL maps to static object position [0,0.25,0], the 22.2-ch label FR maps to static object position [1, 0.25, 0], the 22.2-ch label FC maps to the OAMD bed channel label C, etc. An OAMD representation maps one or more audio channels to one or more audio objects based on (e.g. a value of) the signaling parameter. The one or more audio objects may be dynamic or static audio objects. As defined above a static audio object is an audio object having a fixed spatial position. A dynamic audio object is an audio object whose spatial position can be changed over time. In the example above, the OAMD representation comprises channel labels, bed channel labels and static object positions. The OAMD representation maps the channel labels either to bed channel labels or to static object positions based on (e.g. a value of) the signaling parameter.

Program Assignment and Object Positions

OAMD assumes that bed objects precede dynamic objects. Additionally, bed objects appear in a specific order. For these reasons, the audio for the 22.2-ch content is reordered by audio channel shuffler 303 to satisfy the OAMD order constraints. Audio channel shuffler 303 receives channel shuffle information from metadata generator 304 and uses the channel shuffle information to reorder the 22.2 channels.

FIG. 1B is a table showing bed channel assignment and channel ordering for two different OAMD representations, according to an embodiment. The top row of the table shows the assumed channel order (0-23 channels) and channel labels for the 22.2-ch content (Hamasaki 22.2). The middle row of the table shows the bed assignment labels for the first OAMD representation, and the bottom row of the table shows the bed assignment labels for the second OAMD representation. The converted audio and OAMD metadata is output, with reference to FIG. 3, by format converter 301 to object audio renderer 302, which generates rendered audio.

Referring to the Table in FIG. 1B, the first two channels (0, 1) of 22.2-ch content are FL and FR. For the first OAMD representation (dmix_pos_adj_idx=0), the first two channels (0,1) are reordered ("shuffled") to OAMD channels 15 and channel 16, respectively. For the second OAMD representation (dmix_pos_adj_idx=1), the first two channels (0,1) of the 22.2-ch content are reordered to OAMD bed channels L and R, respectively. In this example, for the first OAMD representation (dmix_pos_adj_idx=0), for the first output channel with index 0, in order to associate the first OAMD representation with it, the index 6 of the channel of the input (e.g. Hamasaki 22.2) is re-reordered/shuffled so that it becomes index channel 0. In other words, in this example, if left channel (L) is present in the input bed channels, this left channel in the first OAMD representation is forced to be the first channel (with index channel 0). All of the bed channels, if present, appear in a specific order, when represented in OAMD. Once the bed channels are reordered, the dynamic objects are reordered as a result of bed channels reordering. Reordering to satisfies certain OAMD representation order constraints. The constraints depend on OAMD specification which are used by the OBA playback device/system. For example, for an OBA playback device/system compatible with Dolby Atmos, the OAMD transmitted in systems and codecs containing Dolby Atmos content is specified by the Dolby Atoms OAMD specifications. These specifications/constraints determine the order of OAMD bed channels to be, e.g., as shown in FIG. 1A and as follows, with the corresponding channel labels within brackets: Left (L), right (R), Center (C), Low-Frequency Effects (LFE), Left Surround (Ls), Right Surround (Rs), Left Rear Surround (Lrs), Right Rear Surround (Rrs), Left Front High (Lfh), Right Front High (Rfh), Left Top Middle (Ltm), Right Top Middle (Rtm), Left Rear High (Lrh), Right Rear High (Rrh) and Low-Frequency Effects 2 (LFE2).

Dimensional Trim Metadata

FIG. 2A is a table showing dimensional trim metadata, according to an embodiment. To ensure that the rendering of 22.2-ch content to OBA content is as closely matched to the downmixes specified by the 22.2-ch specification, dimensional trim metadata is included in the OAMD that accompanies the 22.2-ch content delivered to an OBA rendering device. Object trim is used to lower the level of out-of-screen elements that are included in a mix. This can be desirable when immersive mixes are reproduced in layouts with few loudspeakers.

In an embodiment, a first metadata field includes the parameter warp_mode which if set to the value "0" indicates normal rendering (i.e., no warping) of objects in 5.1.X output configurations. If the warp_mode is set to the value "1" warping is applied to the objects in the 5.1.X output configuration. Warp refers to how the renderer deals with content that is panned between the midpoint and rear of a listening environment (e.g., a room). With warp, the content is presented at a constant level in the surround speakers between the rear and midpoint of the listening environment, avoiding any need for phantom imaging until it is in the front half of the listening environment.

A second metadata field in the dimensional trim metadata table includes per-configuration trims/balance controls for eight speaker configurations (e.g., 2.0, 5.1.0, 7.1.0, 2.1.2, 5.1.2, 7.1.2, 2.1.4, 5.1.4, 7.1.4), as shown in FIG. 2B. There are metadata fields for automatic trimming (auto_trim), center trim (center_trim), surround trim (surround_trim), height trim (height_trim) and front/back balance trim (fb_balance_ohfl, fb_balance_surr)

With reference to the table of FIG. 2A, a third metadata field includes the parameter object_trim_bypass, which has a value that applies to all bed and dynamic objects in the 22.2-ch channel content. If object_trim_bypass is set to the value of “1” no trim is applied to the bed and dynamic objects.

Object Gain

OAMD allows each object to have an individual object gain (described by an object_gain field). This gain is applied by the object audio renderer 302. Object gain allows compensation of differences between downmix values of the 22.2-ch content and the rendering of the OAMD representations of the 22.2-ch content. In an embodiment, the object gain is set to −3 dB for objects with a bed channel assignment of LFE1 or LFE2 and 0 dB for all other objects. Other values for object gain can be used depending on the application.

Example Applications

Auditioning 22.2 Content as OBA

FIG. 3 is a block diagram of an exemplary system 300 for converting a 22.2-ch audio bitstream into audio and OAMD without using bitstream encoding, according to an embodiment. System 300 is used in an application where 22.2-ch content is auditioned as OBA content on an OBA playback system (Dolby® Atmos®).

System 300 includes format converter 301 and object audio renderer 302. Format converter 301 further includes audio channel shuffler 303 and OAMD metadata generator 304. Some examples of OAMD metadata include but are not limited to content description metadata, property update metadata and trim data. The 22.2-ch content 305 (e.g., a file or live stream) includes 22.2-ch audio and metadata which is input into format converter 301. OAMD metadata generator 304 maps the 22.2-ch metadata to OAMD, such as, for example, in conformance with principles as described in reference to FIG. 1A, and generates channel shuffle information. The channel shuffle information describes the channel reordering of the 22.2-ch content which is applied by audio channel shuffler 303, such as, for example, in conformance with principles as described in reference to FIG. 1B. The output of audio channel shuffler 303 is the reordered audio channels. The output of format converter 301 is the reordered channels of audio and OAMD, which is input into object audio renderer 302. Object audio renderer 302 processes the audio using the OAMD to adapt it to a particular loudspeaker layout.

Transmitting 22.2 Content as OBA

Figure 4:
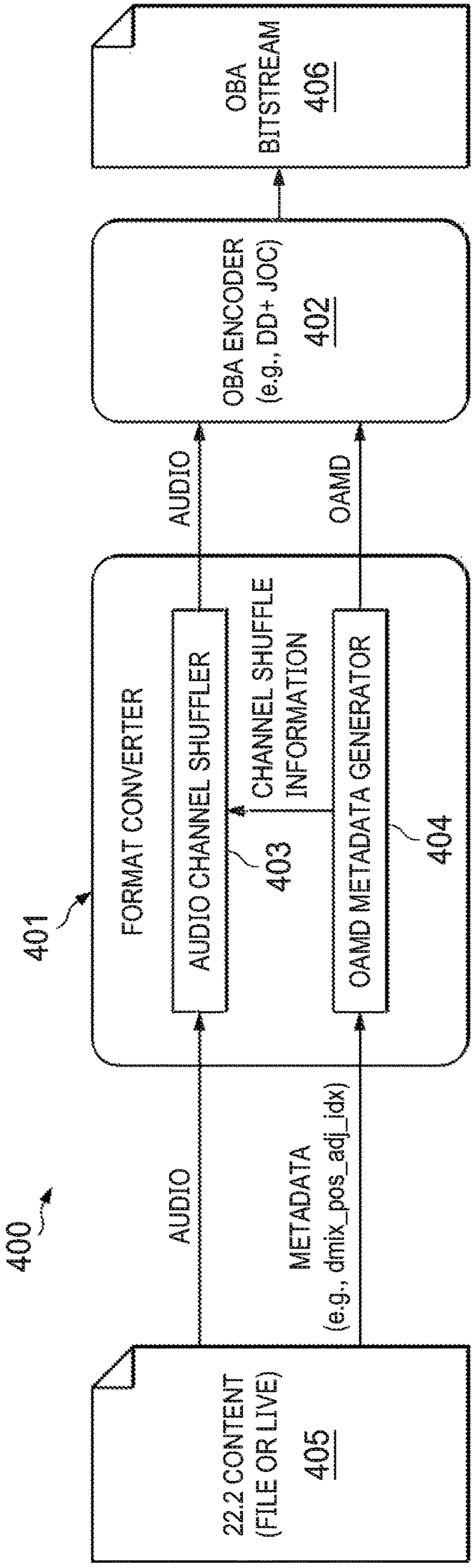
FIG. 4 is a block diagram of a system for converting a 22.2-ch audio bitstream into audio objects and OAMD using bitstream encoding, according to an embodiment.

FIG. 4 is a block diagram of an exemplary system 400 for converting a 22.2-ch audio bitstream into audio objects and OAMD using bitstream encoding, according to an embodiment. In this application, rather than transmitting 22.2-ch content, the 22.2-ch content is format converted and transmitted as OBA using an OBA codec.

System 400 includes format converter 401 and OBA encoder 402. Format converter 401 further includes OAMD metadata generator 404 and audio channel shuffler 403. Some examples of OAMD metadata include but are not limited to content description metadata, property update metadata and trim data. The 22.2-ch content 405 (e.g., a file or live stream) includes 22.2-ch audio and metadata which is input into format converter 401. OAMD metadata generator 404 maps the 22.2-ch metadata to OAMD, such as, for example, in conformance with principles as described in reference to FIG. 1A, and generates channel shuffle information. The channel shuffle information describes the channel reordering of the 22.2-ch content which is applied by audio channel shuffler 403, such as, for example, in conformance with principles as described in reference to FIG. 1B. The output of audio channel shuffler 403 is the reordered audio channels.

The output of format converter 401 is the reordered channels of audio and OAMD, which is input into OBA encoder 402. OBA encoder 402 encodes the audio using the OAMD (e.g., using JOC) to generate an OBA bitstream 406, which can be sent to an OBA playback device downstream, where it is rendered by an object audio renderer that processes the audio to adapt it to a particular loudspeaker layout.

Converting Transmitted 22.2 Content to OBA for Rendering in Source Device

Figure 5:
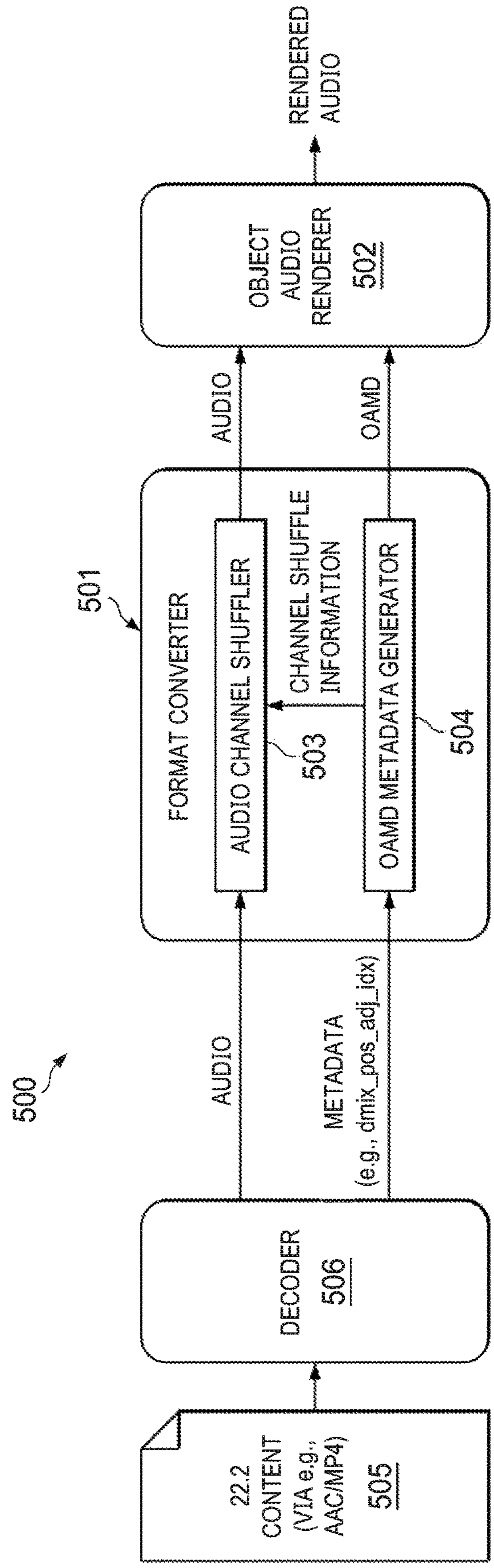
FIG. 5 is a block diagram of a system for converting a 22.2-ch audio bitstream into audio objects and OAMD for rendering in a source device, according to an embodiment.

FIG. 5 is a block diagram of an exemplary system for converting a 22.2-ch audio bitstream into audio objects and OAMD for rendering in a source device, according to an embodiment. In this application, a source device, such as a set-top box (STB) or audio/video recorder (AVR), receives 22.2-ch content from a native audio bitstream, and after format conversion by a format converter, the content is rendered using an object audio renderer. An example native audio bitstream formant is the advanced audio coding (AAC) standard bitstream format.

System 500 includes format converter 501 and object audio renderer 502 and decoder 506. Format converter 501 further includes OAMD metadata generator 504 and audio channel shuffler 503. Some examples of OAMD metadata include but are not limited to content description metadata, property update metadata and trim data. The audio bitstream 505 (e.g., AAC/MP4) includes 22.2-ch audio and metadata which is input into decoder 506 (e.g., an AAC/MP4 decoder). The output of decoder 506 is the 22.2-ch audio and metadata, which input into format converter 501. OAMD metadata generator 504 maps the 22.2-ch metadata to OAMD, such as, for example, in conformance with principles as described in reference to FIG. 1A, and generates channel shuffle information. The channel shuffle information describes the channel reordering of the 22.2-ch content which is applied by audio channel shuffler 503, such as, for example, in conformance with principles as described in reference to FIG. 1B. The output of audio channel shuffler 503 is the reordered audio channels. The output of format converter 501 is the reordered channels of audio and OAMD, which is input into object audio renderer 502. Object audio renderer 502 processes the audio using the OAMD to adapt it to a particular loudspeaker layout.

Converting Transmitted 22.2 Content to OBA for Transmission Over HDMI for External Rendering (STBA/VR/SB)

Figure 6A:
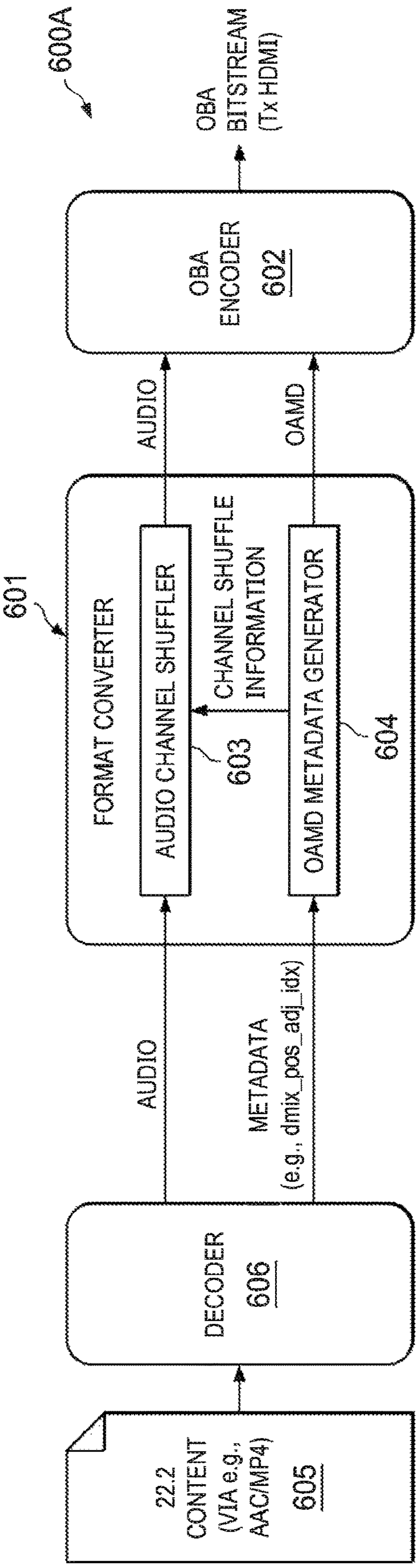
FIGS. 6A and 6B are block diagrams of a system for converting a 22.2-ch audio bitstream into audio objects and OAMD for transmission over a high-definition multimedia interface (HDMI) for external rendering, according to an embodiment.
Figure 6B:
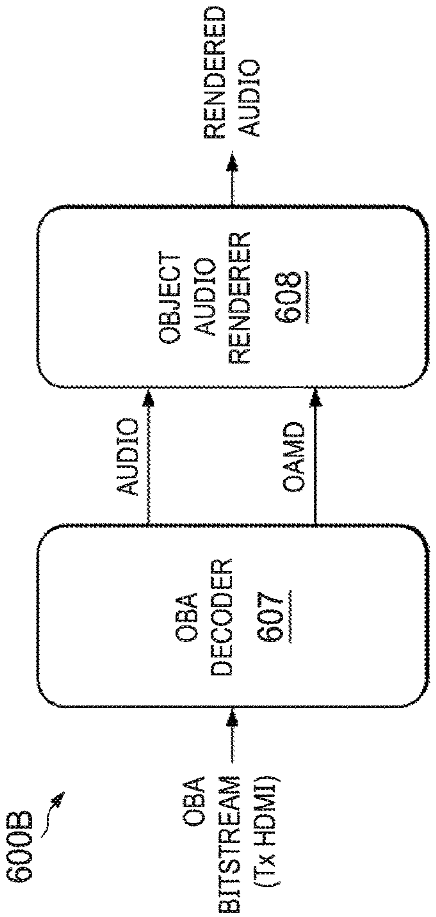

FIGS. 6A and 6B are a block diagram of an exemplary system for converting a 22.2-ch audio bitstream into audio objects and OAMD for transmission over a high definition multimedia interface (HDMI) for external rendering, according to an embodiment. In this application, the channel shuffler information as well as the OAMD are generated in an encoder and packaged inside a native audio bitstream (e.g., AAC) to be transmitted. In this configuration, the format conversion that occurs is simplified into an audio shuffler. The shuffled audio along with the OAMD are sent to an OBA encoder for transmission in a bitstream over HDMI. On the receiver side, the bitstream is decoded and rendered by an object audio renderer.

Referring to FIG. 6A, encoding system 600A includes format converter 601 and OBA encoder 602 and decoder 606. Format converter 601 further includes OAMD metadata generator 604 and audio channel shuffler 603. Some examples of OAMD metadata include but are not limited to content description metadata, property update metadata and trim data. The native audio bitstream 605 (e.g., AAC/MP4) includes 22.2-ch audio and metadata which is input into decoder 606 (e.g., an AAC/MP4 decoder). The output of decoder 606 is the 22.2-ch audio and metadata, which input into format converter 601. OAMD metadata generator 604 maps the 22.2-ch metadata to OAMD, such as, for example, in conformance with principles as described in reference to FIG. 1A, and generates channel shuffle information. The channel shuffle information describes the channel reordering of the 22.2-ch content which is applied by audio channel shuffler 603, such as, for example, in conformance with principles as described in reference to FIG. 1B. The output of audio channel shuffler 603 is the reordered audio channels. The output of format converter 601 is the reordered channels of audio and OAMD, which is input into OBA encoder 602. The OBA encoder 602 encodes the audio and the OAMD and outputs a OBA bitstream that includes the audio and OAMD.

Referring to FIG. 6B, decoding system 600B includes OBA decoder 607 and object audio renderer 608. The OBA bitstream is input into OBA decoder 607 which outputs audio and OAMD, which is input into object audio renderer 608. Object audio renderer 608 processes the audio using the OAMD to adapt it to a particular loudspeaker layout.

Figure 7A:
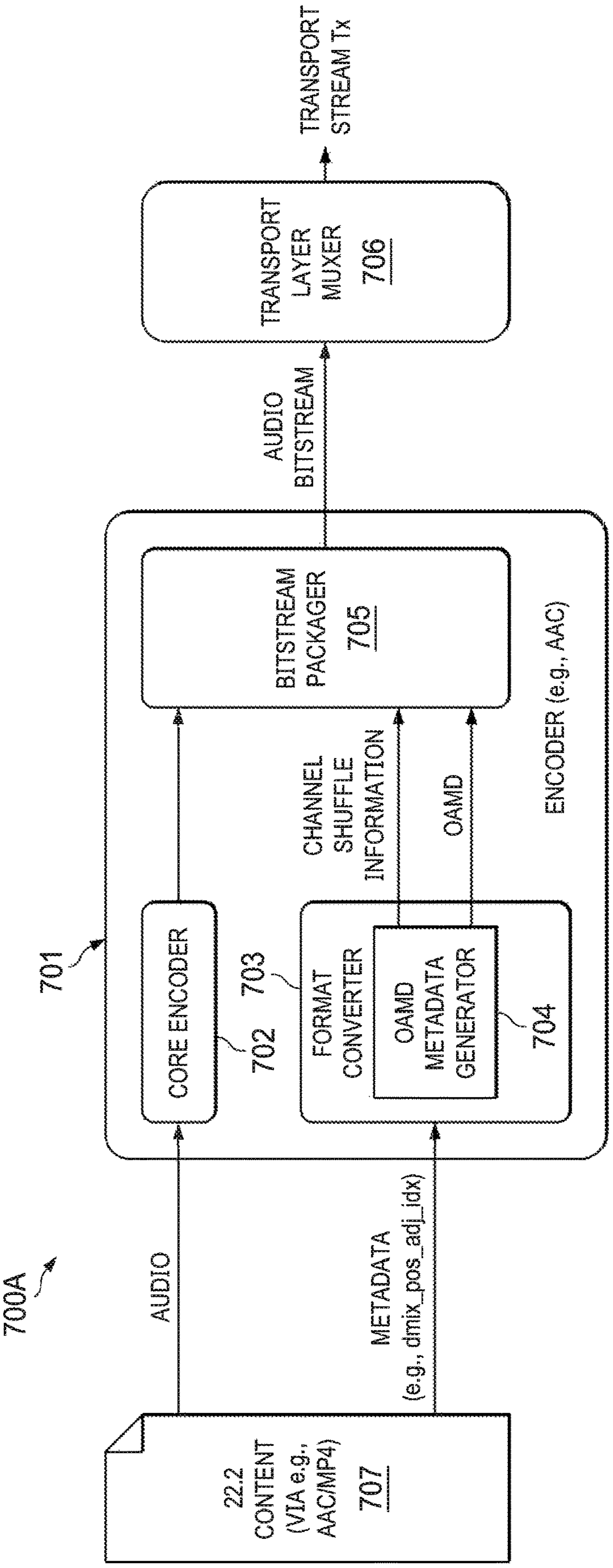
FIGS. 7A-7C are block diagrams of a system for converting a 22.2-ch audio bitstream into audio objects and OAMD, where channel shuffle information and OAMD are packaged inside a native audio bitstream, according to an embodiment.
Figure 7B:
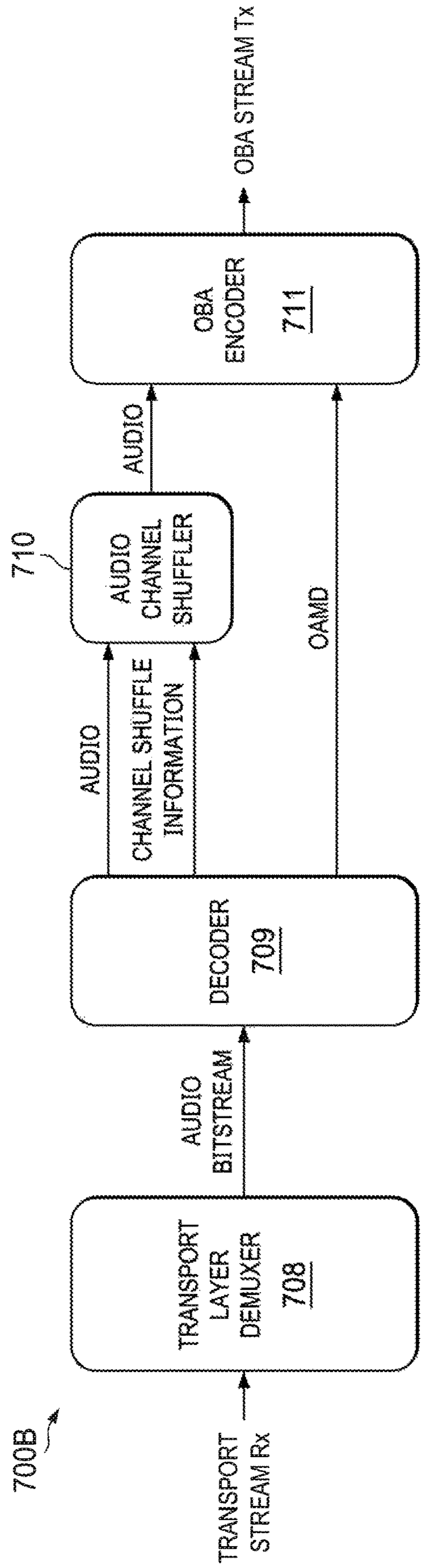
Figure 7C:
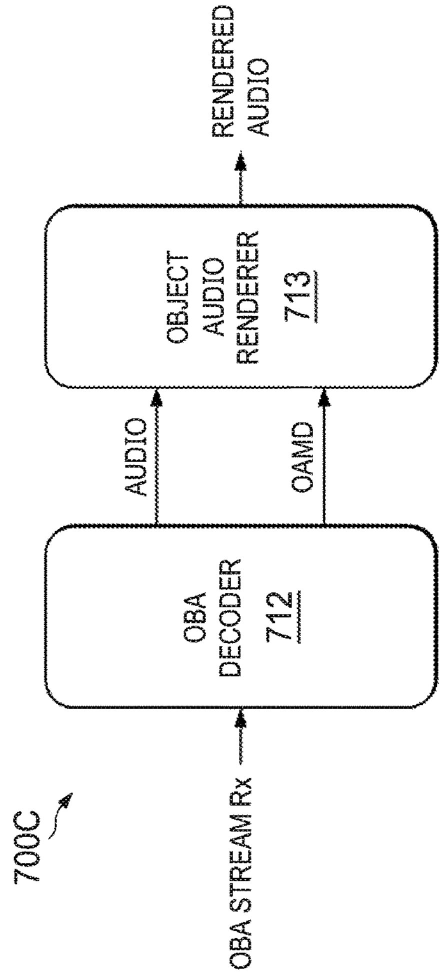

Transmitting 22.2 Pre-Computed OAMD Via Native Bitstream for Transmission Over HDMI FIGS. 7A-7C are block diagrams of exemplary systems for converting a 22.2-ch audio bitstream into audio objects and OAMD, where the channel shuffle information and OAMD are packaged inside a native audio bitstream, according to an embodiment. In the previous example applications the OAMD is generated after the decoder (e.g., AAC decoder). It is possible, however, to embed the channel shuffling information and OAMD into the transmission format (either in a native audio bitstream or a transport layer), as an alternative embodiment. In this application, the channel shuffle information as well as the OAMD are generated in the encoder and are packaged inside the native audio bitstream (e.g., AAC bitstream) to be transmitted. In this configuration, the format conversion that occurs is simplified into an audio shuffler. The shuffled audio along with the OAMD are sent to an OBA encoder for transmission over HDMI. On the receive side, the OBA bitstream is decoded and rendered using an object audio renderer.

Referring to FIG. 7A, encoding system 700A includes encoder 701 (e.g., an AAC encoder) and transport layer multiplexer 706. Encoder 701 further includes core encoder 702, format converter 703 and bitstream packager 705. Format converter 703 further includes OAMD metadata generator 704, which may be, for example a Dolby ATMOS Metadata generator. Some examples of OAMD metadata include but are not limited to content description metadata, property update metadata and trim data.

The native audio bitstream 707 (e.g., AAC/MP4) includes 22.2-ch audio and metadata. The audio is input into core encoder 702 of encoder 701 which encodes the audio into the native audio format and outputs the encoded audio to bitstream packager 705. The OAMD metadata generator 704 maps the 22.2-ch metadata to OAMD, such as, for example, in conformance with principles as described in reference to FIG. 1A, and generates channel shuffle information. The channel shuffle information describes the channel reordering of the 22.2-ch content, such as, for example, in conformance with principles as described in reference to FIG. 1B. The channel shuffle information is input into bitstream packager 705 together with the OAMD. The output of the bitstream packager 705 is a native audio bitstream that includes the channel shuffle information and the OAMD. The native audio bitstream is input into transport layer multiplexer 706, which outputs a transport stream that includes the native audio bitstream.

Referring to FIG. 7B, decoding/encoding system 700B includes transport layer demultiplexer 708, decoder 709, audio channel shuffler 710 and OBA encoder 711. Transport layer demultiplexer 708 demultiplexes the audio and OAMD from the transport bitstream and inputs the audio and OAMD into decoder 709, which decodes the audio and the OAMD from the native audio bitstream. The decoded audio and OAMD is then input into OBA encoder 711 which encodes the audio and OAMD into an OBA bitstream.

Referring to FIG. 7C, decoding system 700C includes OBA decoder 712 and object audio renderer 713. The OBA bitstream is input into OBA decoder 712, which outputs the audio and OAMD, which is input into object audio renderer 713. Object audio renderer 713 processes the audio using the OAMD to adapt it to a particular loudspeaker layout.

Transmitting Pre-Computed OAMD for Rendering in Source Device

Figure 8A:
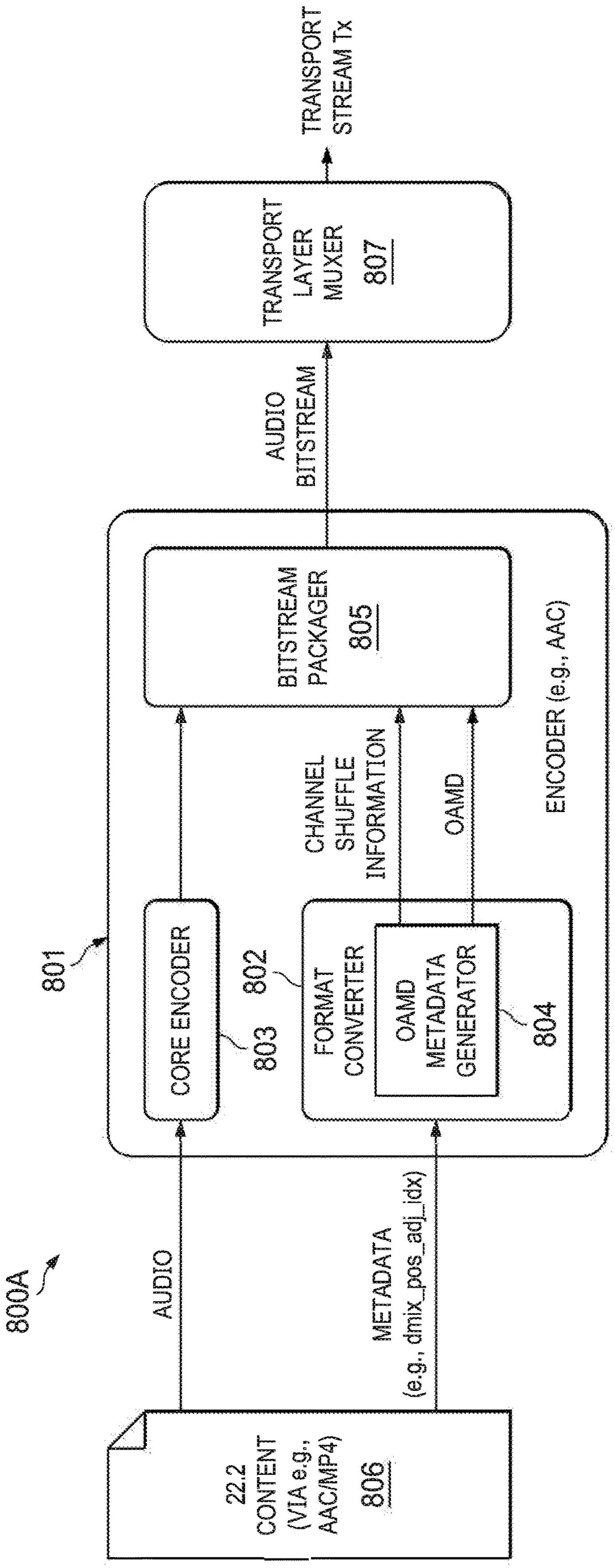
FIGS. 8A and 8B are a block diagram of a system for converting a 22.2-ch audio bitstream into audio objects and OAMD, where channel shuffle information and OAMD are packaged inside a native audio bitstream for rendering in a source device, according to an embodiment.
Figure 8B:
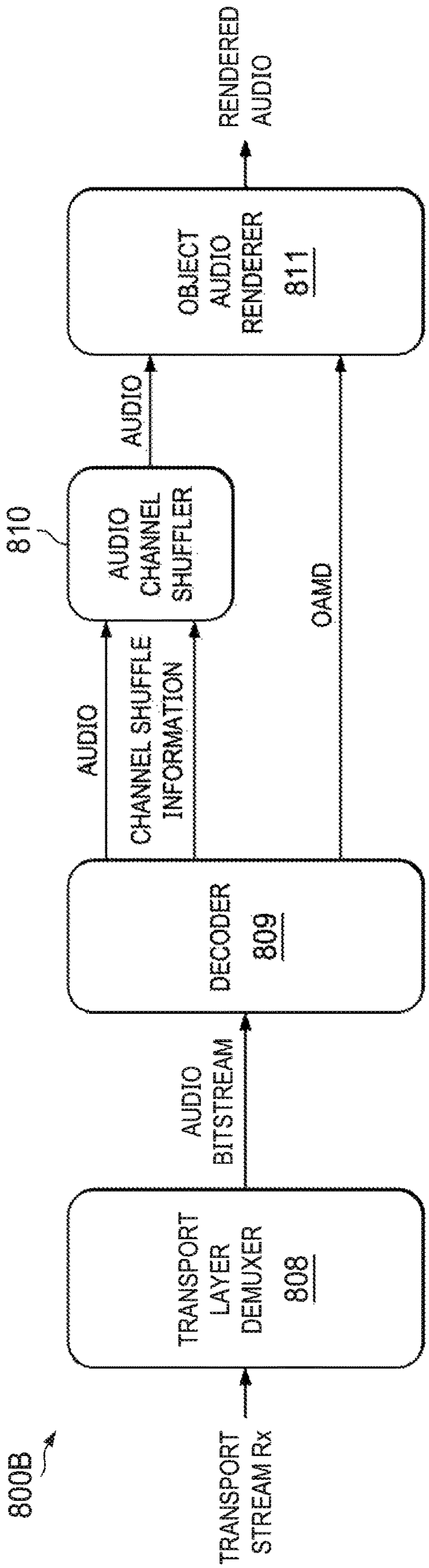

FIGS. 8A and 8B are a block diagrams of exemplary systems for converting a 22.2-ch audio bitstream into audio objects and OAMD, where the channel shuffle information and OAMD are packaged inside a native audio bitstream for rendering in a source device, according to an embodiment. In this application, the channel shuffle information as well as the OAMD are generated in an encoder and are packaged inside a native audio bitstream (e.g., AAC bitstream) to be transmitted via a transport layer. In this configuration, the format conversion that occurs is simplified into an audio shuffler. The shuffled audio along with the OAMD are sent to the object audio renderer for rendering.

Referring to FIG. 8A, encoding system 800A includes encoder 801 (e.g., an AAC encoder) and transport layer multiplexer 807. Encoder 801 further includes core encoder 803, format converter 802 and bitstream packager 805. Format converter 802 further includes OAMD metadata generator 804, which may be, for example a Dolby ATMOS Metadata generator. Some examples of OAMD metadata include but are not limited to content description metadata, property update metadata and trim data.

The native audio bitstream 806 (e.g., AAC/MP4) includes 22.2-ch audio and metadata. The audio is input into core encoder 803 of encoder 801 which encodes the audio into the native audio format and outputs the encoded audio to bitstream packager 805. The OAMD metadata generator 804 maps the 22.2-ch metadata to OAMD, such as, for example, in conformance with principles as described in reference to FIG. 1A, and generates channel shuffle information. The channel shuffle information describes the channel reordering of the 22.2-ch content, such as, for example, in conformance with principles as described in reference to FIG. 1B. The channel shuffle information is input into bitstream packager 805 together with the OAMD. The output of the bitstream packager 805 is a native audio bitstream that includes the channel shuffle information and the OAMD. The native audio bitstream is input into transport layer multiplexer 807, which outputs a transport stream that includes the native audio bitstream.

Referring to FIG. 8B, decoding system 800B includes transport layer demultiplexer 808, decoder 809, audio channel shuffler 810 and object audio renderer 811. Transport layer demultiplexer 808 demultiplexes the audio and OAMD from the transport bitstream and inputs the audio and OAMD into decoder 809, which decodes the audio and the OAMD from the native audio bitstream. The decoded audio and OAMD is then input into object audio renderer 811. Object audio renderer 811 processes the audio using the OAMD to adapt it to a particular loudspeaker layout.

Transmitting Pre-Computed OAMD Via Transport Layer for Transmission Over HDMI

Figure 9A:
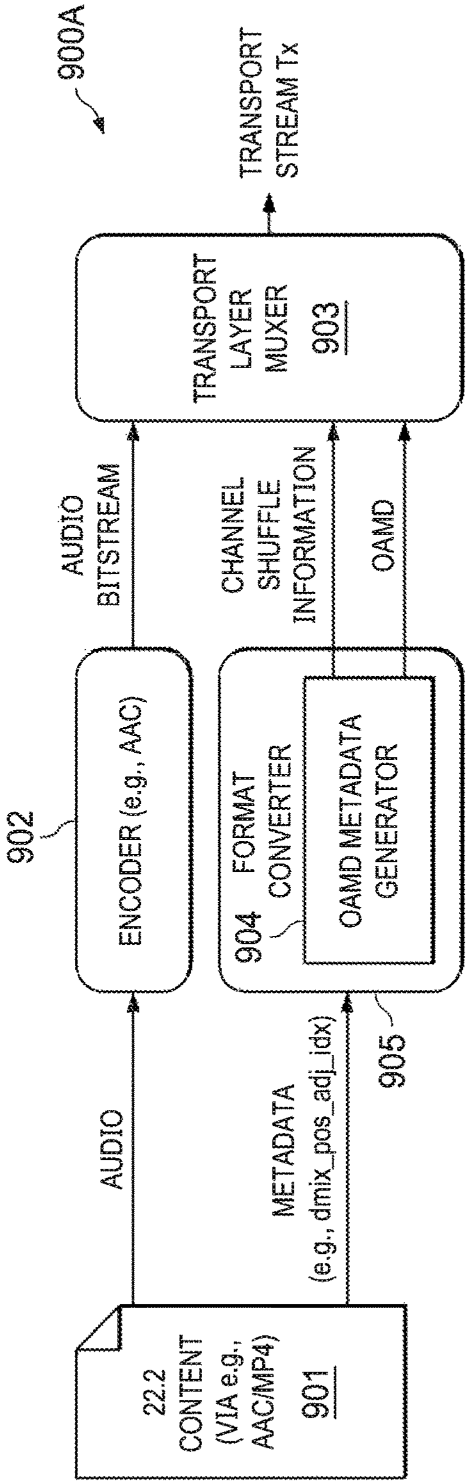
FIGS. 9A-9C are block diagrams of a system for converting a 22.2-ch audio bitstream into audio objects and OAMD, where channel shuffle information and OAMD are embedded in a transport layer for delivery to source devices, and are then packaged inside a native audio bitstream for transmission over HDMI, according to an embodiment.
Figure 9B:
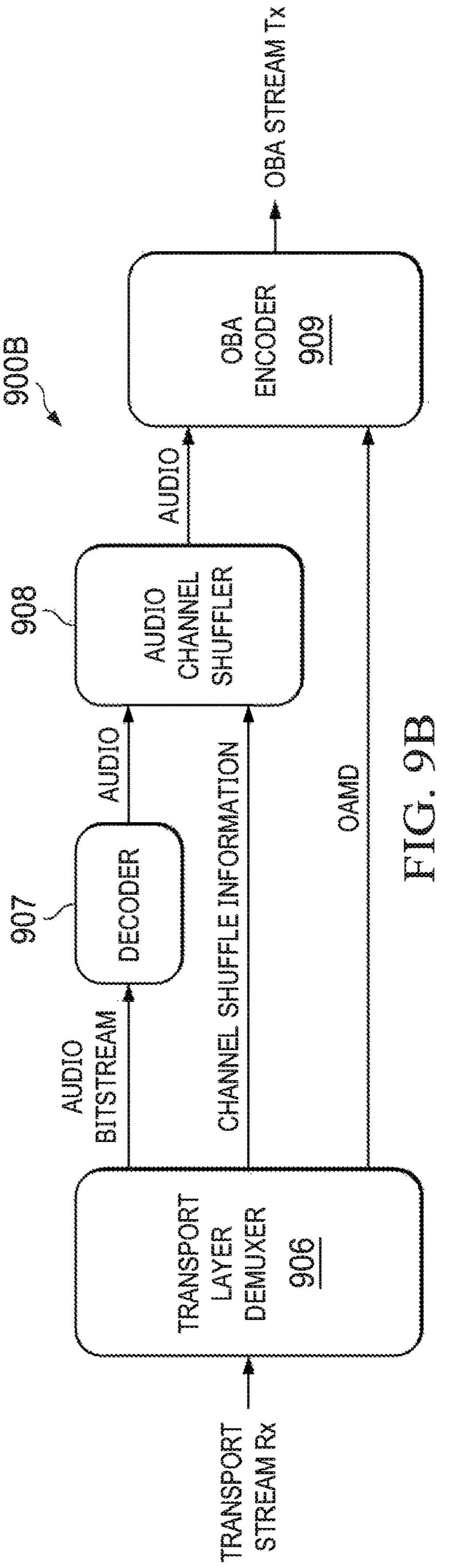
Figure 9C:
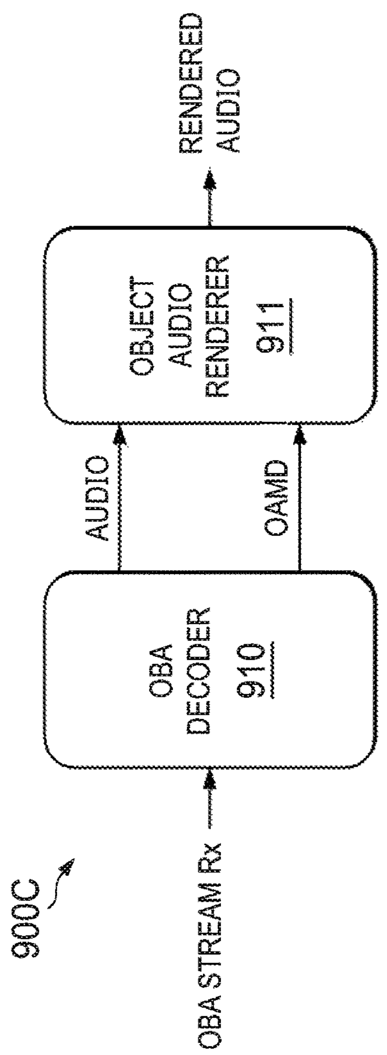

FIGS. 9A-9C are block diagrams of exemplary systems for converting a 22.2-ch audio bitstream into audio objects and OAMD, where channel shuffle information and OAMD are embedded in a transport layer for delivery to source devices, and are then packaged inside a native audio bitstream for transmission over HDMI, according to an embodiment.

The OAMD used to represent 22.2-ch content is static for a program. For this reason, it is desirable to avoid sending OAMD frequently to avoid data rate increases in the audio bitstream. This can be achieved by sending the static OAMD and channel shuffle information within a transport layer and transmitted in a transport layer. When received, the OAMD and channel shuffle information are used by the OBA encoder to subsequent transmission over HDMI. An example transport layer is base media file format (BMFF) described in ISO/IEC 14496-12-MPEG-4 Part 12, which defines a general structure for time-based multimedia files, such as video and audio. In an embodiment that uses MPEG-DASH, the OAMD is included in a manifest.

Referring to FIG. 9A, encoding system 900A includes encoder 902 (e.g., an AAC encoder), format convert 905 and transport layer multiplexer 903. Format converter 905 further includes OAMD metadata generator 904. Some examples of OAMD metadata include but are not limited to content description metadata, property update metadata and trim data.

The native audio bitstream 901 (e.g., AAC/MP4) includes 22.2-ch audio and metadata. The audio is input into encoder 902 which encodes the audio into the native audio format and outputs the encoded audio to transport layer multiplexer 903. The OAMD metadata generator 904 maps the 22.2-ch metadata to OAMD, such as, for example, in conformance with principles as described in reference to FIG. 1A, and generates channel shuffle information. The channel shuffle information describes the channel reordering of the 22.2-ch content, such as, for example, in conformance with principles as described in reference to FIG. 1B. The channel shuffle information is input into transport layer multiplexer 903 together with the OAMD. The output of the transport layer multiplexer 903 is a transport bitstream (e.g., an MPEG-2 transport stream) or package file (e.g., an ISO BMFF file) or media presentation description (e.g., MPEG-DASH manifest) that includes the native audio bitstream.

Referring to FIG. 9B, decoding system 900B includes transport layer demultiplexer 906, decoder 907, audio channel shuffler 908 and OBA encoder 909. Transport layer demultiplexer 906 demultiplexes the audio, channel shuffle information and OAMD from the transport bitstream. The decoded audio is input to the audio bitstream into decoder 907 (e.g. AAC decoder), which decodes the audio to recover (i.e. determine or extract) the native audio bitstream. The native audio bitstream is then input into audio channel shuffler 908 to together with the channel shuffle information output by transport layer demultiplexer 906. The audio with reordered channels is output from audio channel shuffler 908 and input into OBA encoder 909 together with the OAMD. The output of OBA encoder is an OBA bitstream.

Referring to FIG. 9C, decoding system 900C includes OBA decoder 910 and object audio renderer 911. The OBA bitstream is input into OBA decoder 910, which outputs the audio and OAMD, which is input into object audio renderer 911. Object audio renderer 911 processes the audio using the OAMD to adapt it to a particular loudspeaker layout.

Figure 10A:
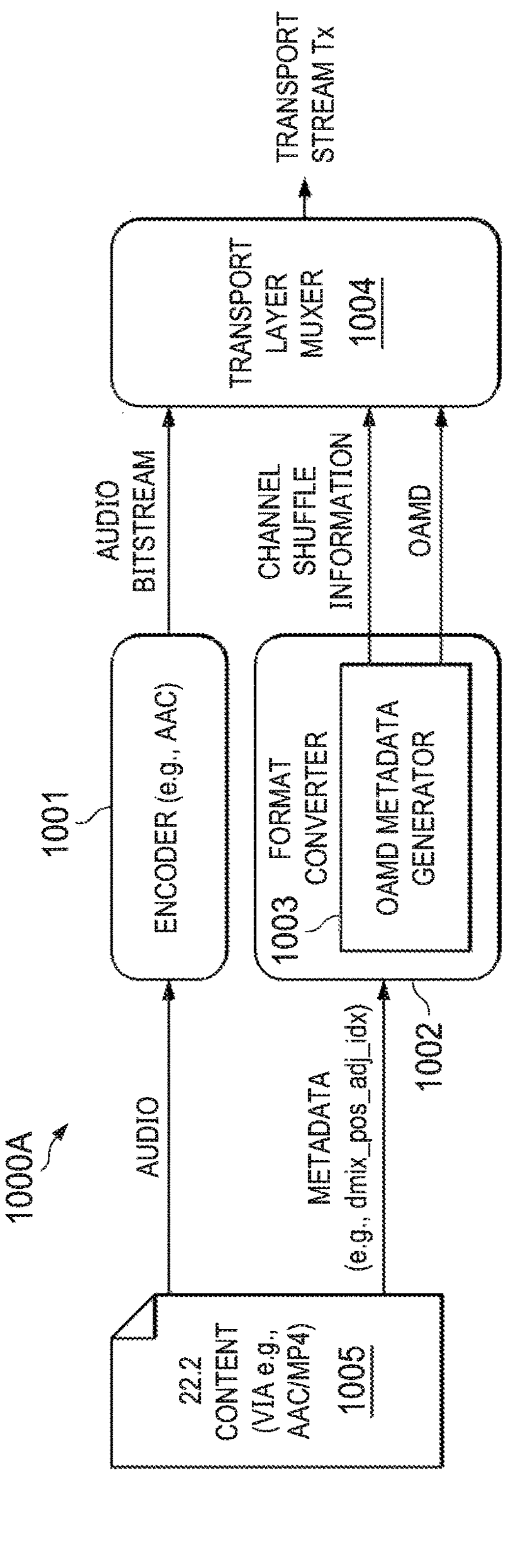
FIGS. 10A and 10B are block diagrams of a system for converting a 22.2-ch audio bitstream into audio objects and OAMD, where channel shuffle information and OAMD are embedded in a transport layer for rendering in source devices, according to an embodiment.
Figure 10B:
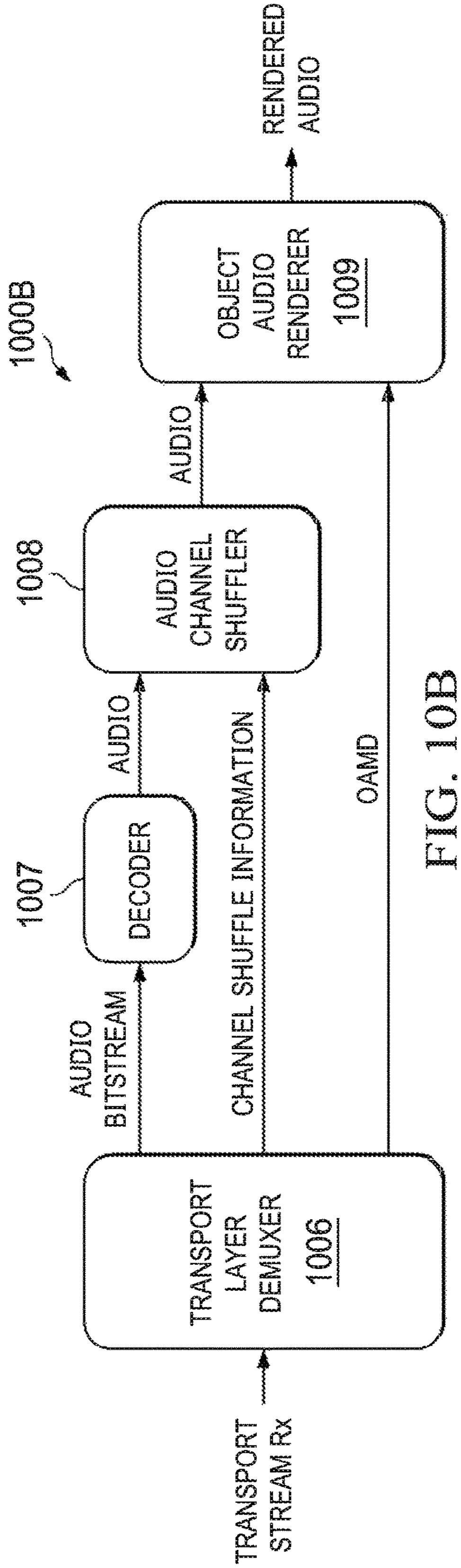

Transmitting Pre-Computed OAMD Via Transport Layer for Rendering in Source Device FIGS. 10A and 10B are a block diagrams of exemplary systems for converting a 22.2-ch audio bitstream into audio objects and OAMD, where the channel shuffle information and OAMD are embedded in a transport layer for rendering in source devices (e.g., STB, AVR), according to an embodiment. The OAMD used to represent 22.2-ch content is static for a program. For this reason, it is desirable to avoid sending OAMD frequently to avoid data rate increases in the audio bitstream. This can be achieved by sending the static OAMD and channel shuffle information within a transport layer and transmitted in a transport layer. When received, the OAMD and channel shuffle information are used by an object audio renderer for rendering the content. An example transport layer is the base media file format (BMFF) described in ISO/IEC 14496-12-MPEG-4 Part 12, which defines a general structure for time-based multimedia files, such as video and audio. In an embodiment, the OAMD is included in an MPEG-DASH manifest.

Referring to FIG. 10A, encoding system 1000A includes encoder 1001 (e.g., an AAC encoder), format converter 1002 and transport layer multiplexer 1004. Format converter 1002 further includes OAMD metadata generator 1003. Some examples of OAMD metadata include but are not limited to content description metadata, property update metadata and trim data.

The native audio bitstream 1005 (e.g., AAC/MP4) includes 22.2-ch audio and metadata. The audio is input into encoder 1001 which encodes the audio into the native audio format and outputs the encoded audio to transport layer multiplexer 1004. The OAMD metadata generator 1003 maps the 22.2-ch metadata to OAMD, such as, for example, in conformance with principles as described in reference to FIG. 1A, and generates channel shuffle information. The channel shuffle information describes the channel reordering of the 22.2-ch content, such as, for example, in conformance with principles as described in reference to FIG. 1B. The channel shuffle information is input into transport layer multiplexer 1004 together with the OAMD. The output of transport layer multiplexer 1004 is a transport stream that includes the native audio bitstream.

Referring to FIG. 10B, decoding system 1000B includes transport layer demultiplexer 1006, decoder 1007, audio channel shuffler 1008 and object audio renderer 1009. Transport layer demultiplexer 1006 demultiplexes the audio and OAMD from the transport bitstream and inputs the audio and OAMD into decoder 1007, which decodes the audio and the OAMD from the native audio bitstream. The decoded audio and OAMD is then input into object audio renderer 1009. Object audio renderer 1009 processes the audio using the OAMD to adapt it to a particular loudspeaker layout.

Example Process

Figure 11:
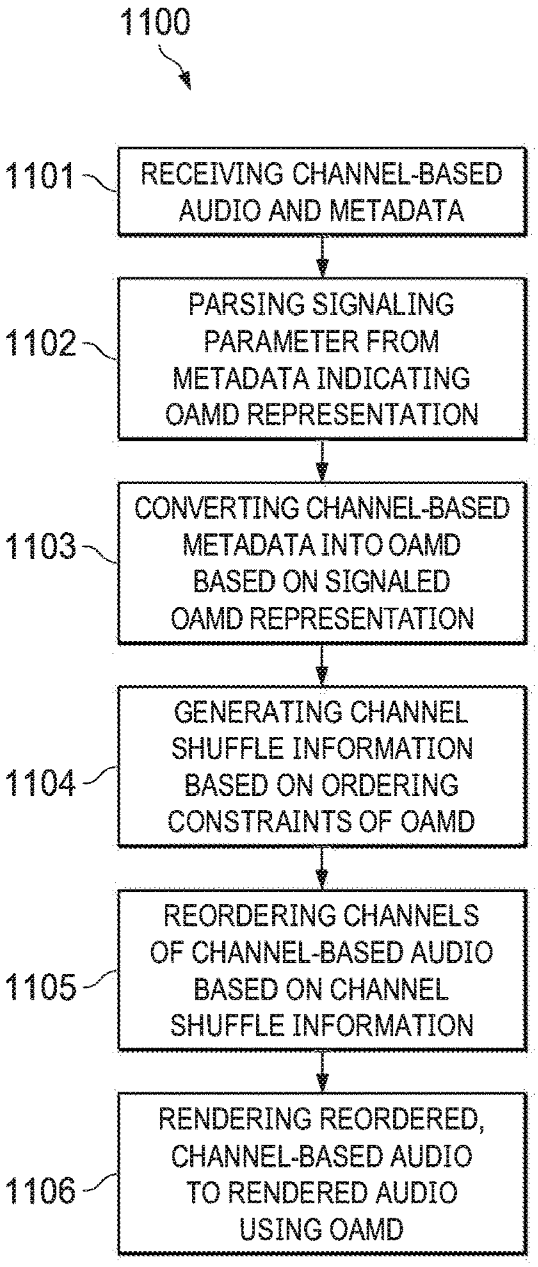
FIG. 11 is a flow diagram of a CBA to OBA conversion process, according to an embodiment.

FIG. 11 is a flow diagram of a CBA to OBA conversion process 1100. Process 1100 can be implemented using the audio system architecture shown in FIG. 3. Process 1100 includes receiving a bitstream including channel-based audio and metadata (1101), parsing a signaling parameter from the bitstream indicating an OAMD representation (1102), converting the channel-based metadata into OAMD based on the signaled OAMD representation (1103), generating channel shuffle information based on ordering constraints of the OAMD (1104), reordering the channels of the channel-based audio based on the channel shuffle information (1105) and rendering the reordered, channel-based audio using the OAMD (1106). Steps 1103 and 1104 above can be performed using, for example, the OAMD representations and bed channel assignments/ordering shown in FIGS. 1A and 1B, respectively, and the audio system architecture shown in FIG. 3. Some examples of OAMD metadata include but are not limited to content description metadata, property update metadata and trim data.

Figure 12:
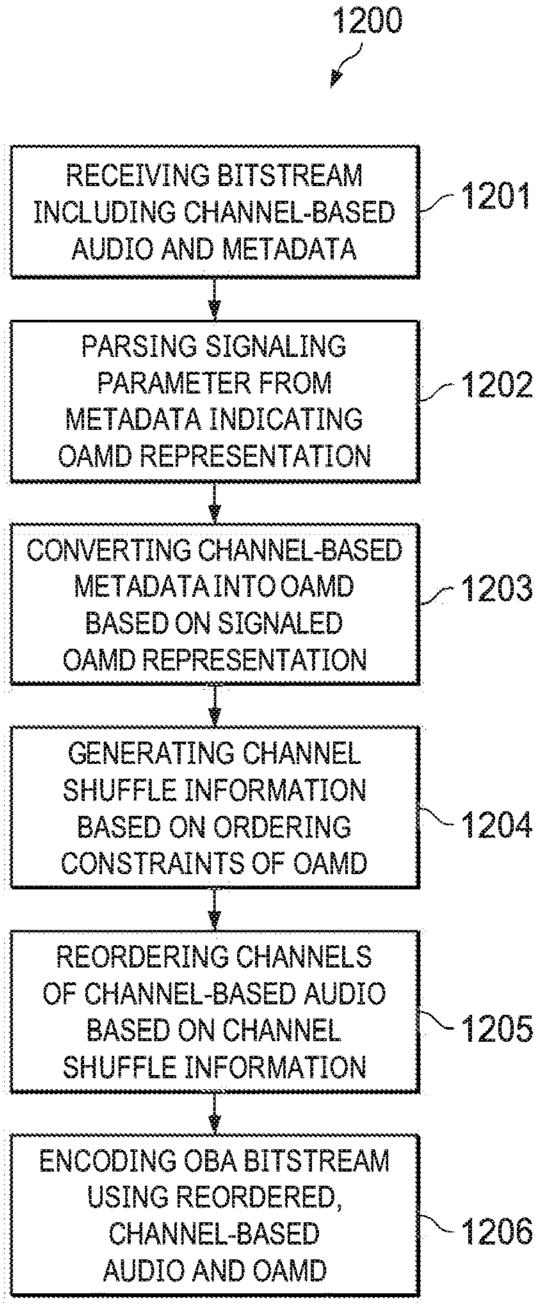
FIG. 12 is a flow diagram of an alternative CBA to OBA conversion process, according to an embodiment.

FIG. 12 is a flow diagram of a CBA to OBA conversion process 1200. Process 1200 can be implemented using the audio system architecture shown in FIG. 4. Process 1200 includes receiving a bitstream including channel-based audio and metadata (1201), parsing a signaling parameter from the bitstream indicating an OAMD representation (1202), converting the channel-based metadata into OAMD based on the signaled OAMD representation (1203), generating channel shuffle information based on ordering constraints of the OAMD (1204), reordering the channels of the channel-based audio based on the channel shuffle information (1205) and encoding the reordered, channel-based audio and OAMD to an OBA bitstream (1206) for transmission to a playback device where the audio is rendered by an object audio renderer using the OAMD. Steps 1203 and 1205 above can be performed using, for example, the OAMD representations and bed channel assignments/ordering shown in FIGS. 1A and 1B, respectively, and the audio system architecture shown in FIG. 4. Some examples of OAMD metadata include but are not limited to content description metadata, property update metadata and trim data.

Figure 13:
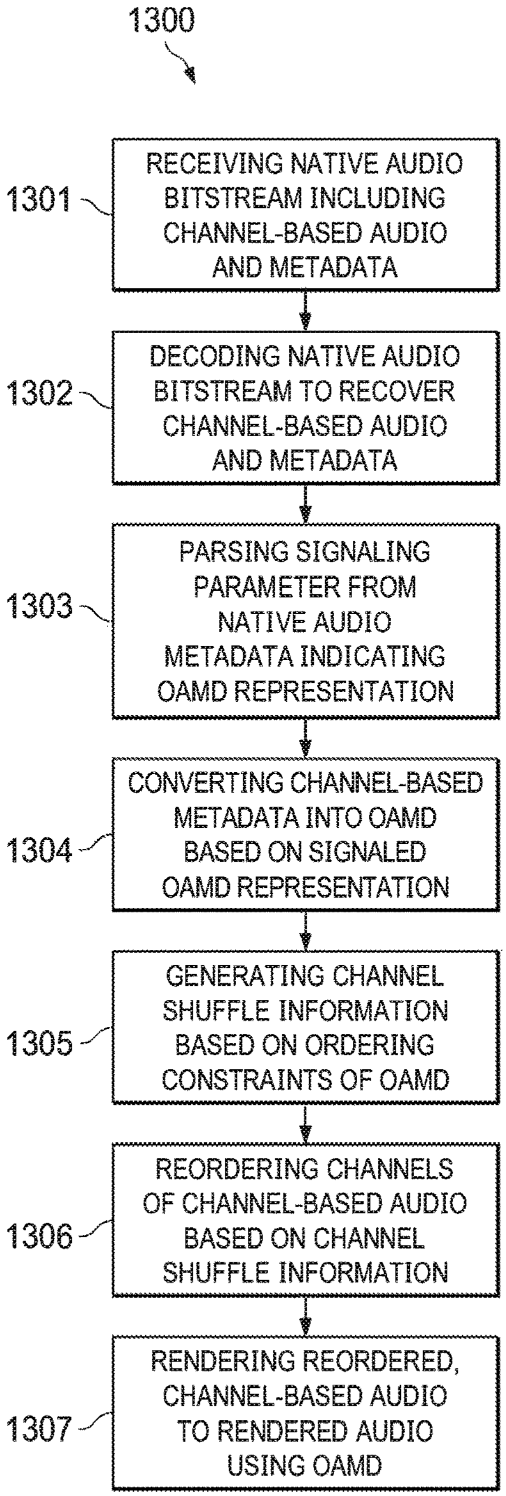
FIG. 13 is a flow diagram of an alternative CBA to OBA conversion process, according to an embodiment.

FIG. 13 is a flow diagram of a CBA to OBA conversion process 1300. Process 1300 can be implemented using the audio system architecture shown in FIG. 5. Process 1300 includes receiving a native audio bitstream including channel-based audio and metadata in a native audio format (1301), decoding the native audio bitstream to recover the channel-based audio and metadata (1302), parsing a signaling parameter from the bitstream indicating an OAMD representation (1303), converting the channel-based metadata into OAMD based on the signaled OAMD representation (1304), generating channel shuffling information based on ordering constraints of the OAMD (1305), reordering the channels of the channel-based audio based on the channel shuffle information (1306), rendering the reordered, channel-based audio using the OAMD (1307). Steps 1304 and 1305 can be performed using, for example, the OAMD representations and bed channel assignments/ordering shown in FIGS. 1A and 1B, respectively, and the audio system architecture shown in FIG. 5.

Figure 14:
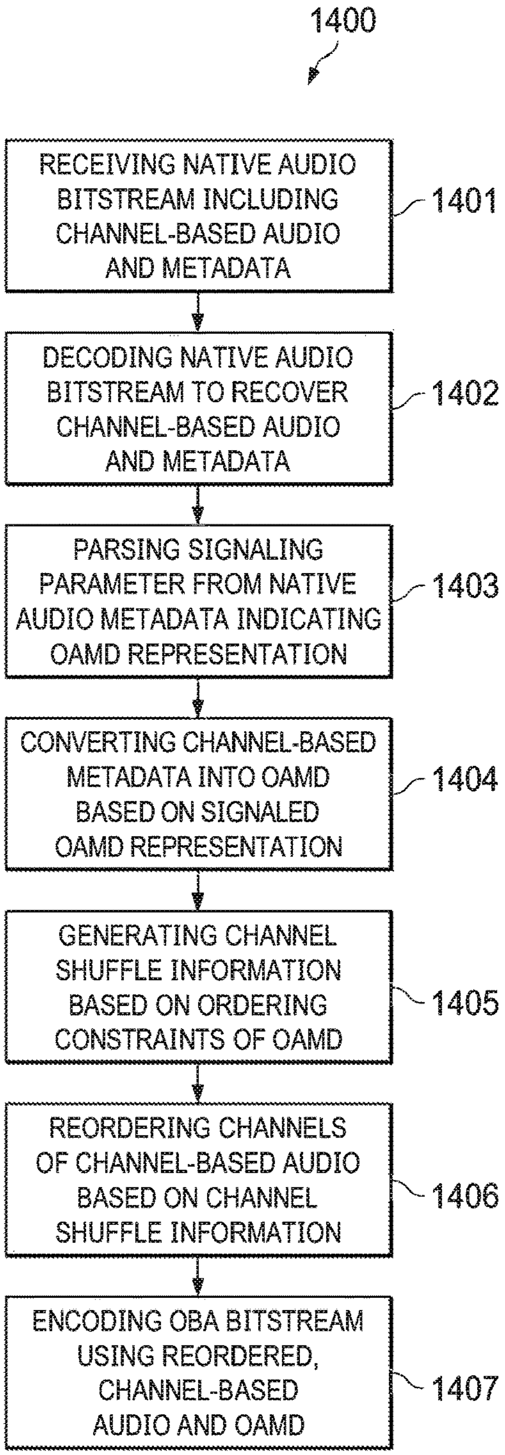
FIG. 14 is a flow diagram of an alternative CBA to OBA conversion process, according to an embodiment.

FIG. 14 is a flow diagram of a CBA to OBA conversion process 1400. Process 1400 can be implemented using the audio system architecture shown in FIGS. 6A and 6B. Process 1400 begins by receiving a native audio bitstream including channel-based audio and metadata in a native audio format (1401), decoding the native audio bitstream to recover, i.e. determine or extract, the channel-based audio and metadata (1402), parsing a signaling parameter from the bitstream indicating an OAMD representation (1403) and converting the channel-based metadata into OAMD based on the signaled OMD representation (1404), generating channel shuffle information based on ordering constraints of the OAMD (1405), reordering the channels of the channel-based audio based on the channel shuffle information (1406), encoding the reordered, channel-based audio and OAMD to an OBA bitstream (1407) for transmission to a playback device where the audio is rendered by an object audio renderer using the OAMD. Steps 1404 and 1405 can be performed using, for example, the OAMD representations and bed channel assignments/ordering shown in FIGS. 1A and 1B, respectively, and the audio system architecture shown in FIGS. 6A and 6B.

Figure 15:
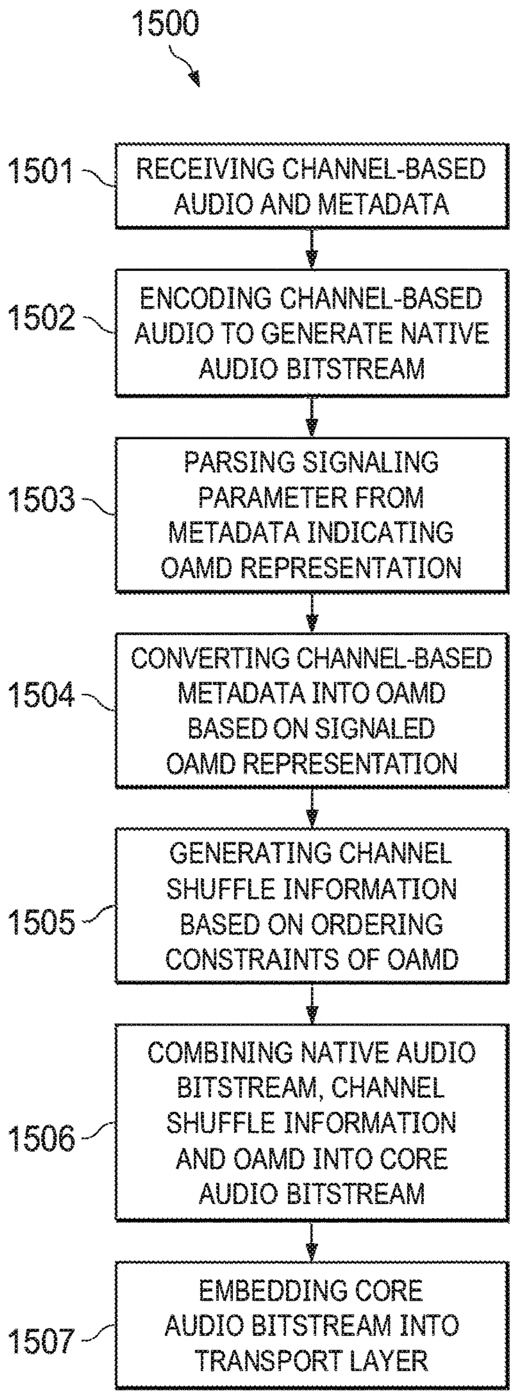
FIG. 15 is a flow diagram of an alternative CBA to OBA conversion process, according to an embodiment.
Figure 16:
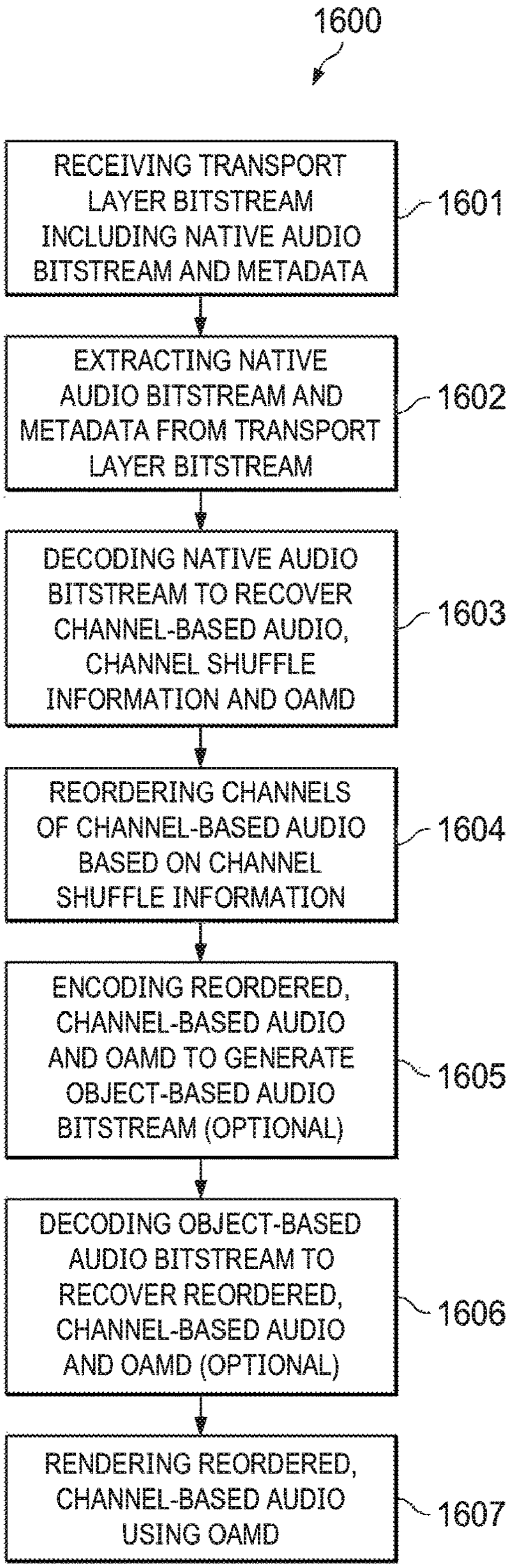
FIG. 16 is a flow diagram of an alternative CBA to OBA conversion process, according to an embodiment.

FIG. 15 is a flow diagram of a CBA to OBA conversion process 1500. Process 1500 can be implemented using the audio system architecture shown in FIGS. 7A-7C. Process 1500 begins by receiving a channel-based audio bitstream including channel-based audio and metadata (1501), encoding the channel-based audio into a native audio bitstream (1502), parsing a signaling parameter from the channel-based metadata indicating an OAMD representation (1503), converting the channel-based metadata into OAMD based on the signaled OMD representation (1504), generating channel shuffle information based on ordering constraints of the OAMD (1505), combining the native audio bitstream, channel shuffle information and OAMD into a combined audio bitstream (1506), including the combined audio bitstream into a transport layer bitstream (1507) for transmission to a playback device for rendering or to a source device for rendering (e.g., STB, AVR). The details of the above-identified steps were described in reference to FIGS. 1A, 1B, 7A, 7C, 8A, 8B, 9A-9C, 10A and 10B FIG. 16 is a flow diagram of a CBA to OBA conversion process 1600. Process 1600 can be implemented using the audio system architecture shown in FIGS. 8A, 8B, 9A-9C, 10A, 10B. Process 1600 begins by receiving a transport layer bitstream including a native audio bitstream and metadata (1601), extracting the native audio bitstream and metadata, channel shuffle information and OAMD from the transport bitstream (1602), decoding the native audio bitstream to recover, i.e. determine or extract, channel-based audio (1603), reordering channels of the channel-based audio using the channel shuffle information (1604), optionally encoding the reordered, channel-based audio and the OAMD into an OBA bitstream (1605) to transmit to a playback device or source device, or optionally decoding the OBA bitstream to recover the reordered, channel-based audio and OAMD 1606 and rendering the reordered, channel-based audio using the OAM 1607 and transmitting to a playback device. The details of the above-identified steps were described in reference to FIGS. 8A, 8B, 9A-9C, 10A and 10B.

Transmitting Pre-Computed OAMD within MPEG-4 Audio or MPEG-D Audio Bitstreams

In an embodiment, OAMD representing 22.2 content is carried within a native audio bitstream, such as an MPEG-4 audio (ISO/IEC 14496-3) bitstream. An example syntax for three embodiments is provided below.

MPEG-4 Syntax Alternative #1

| Syntax | No. of Bits | Mnemonic |
|---|---|---|
| data_stream_element( ){ | | |
| element_instance_tag; | 4 | uimsbf |
| data_byte_align_flag; | 1 | uimsbf |
| reserved; | 3 | uimsbf |
| cnt=count; | 8 | uimsbf |
| if(cnt==255) | | |
| cnt+=esc_count; | 8 | uismsbf |
| if(data_byte_align_flag) | | |
| byte_alignment( ); | | |
| for(i=0; i< cnt; i++) | | |
| data_stream_byte[element_instance_tag][i]; | | |
| } | | |

| MPEG-4 Syntax Alternative #2 | | |
|---|---|---|
| Syntax | No. of Bits | Mnemonic |
| fill_element( ){ | | |
| cnt=count; | | |
| if(cnt==15) | 4 | uimsbf |
| cnt+=esc_count−1; | | |
| while (cnt > 0){ | 8 | uimsbf |
| cnt−=extension_payload(cnt); | | |
| } | | |
| } | | |

| MPEG-4 Syntax Alternative #3 | | |
|---|---|---|
| Syntax | No. of Bits | Mnemonic |
| extension_payload(cnt) | | |
| { | | |
| extension_type; | 4 | usimsbf |
| align=4; | | |
| switch(extension_type){ | | |
| [...] | | |
| Case EXT_OAMD_INFO: | | |
| return oamdInfo ( ); | | |
| [...] | | |
| } | | |
| } | | |

In the above example syntax, the element element_instance_tag is a number to identify the data stream element, and the element extension_payload(int) may be contained inside a fill element (ID_FIL). Each of the above three syntax embodiments describe a "tag" or "extension type" to indicate the meaning of additional data. In an embodiment, a signal can be inserted in the bitstream signaling that additional OAMD and channel shuffle information are present in one of the three extension areas of the bitstream to avoid having the decoder check those areas of the bitstream. For example, the MPEG4_ancillary_data field contains a dolby_surround_mode field with the following semantics. A similar signaling syntax can be used to indicate to a decoder that OAMD is present in the bitstream.

| Definition of dolby_surround_mode Signal | |
|---|---|
| dolby_surround_mode | Description |
| "00" | Dolby surround mode not indicated |
| "01" | 2-ch audio part is not Dolby surround encoded |
| "10" | 2-ch audio part is Dolby surround encoded |
| "11" | Reserved |

In an embodiment, the reserved field in the table above is used to indicate that a pre-computed OAMD payload is embedded somewhere in the extension data of the bitstream. The reserved value of (dolby_surround_mode="11") is used to indicate to a decoder that the extension data fields contain the required OAMD and channel information needed to convert 22.2 to OBA (e.g., Dolby® Atmos®). Alternatively, the reserved field indicates that the content is OBA compatible (e.g., Dolby® Atmos® compatible), and converting the 22.2-ch content to OBA is possible. Thus, if the dolby_surround_mode signal is set to the reserved value "11", the decoder will know that the content is OBA compatible and convert the 22.2-ch content to OBA for further encoding and/or rendering.

In an embodiment, OAMD representing 22.2 content is carried within a native audio bitstream, such as MPEG-D USAC (ISO/IEC 23003-3) audio bitstream. An example syntax for such an embodiment is provided below.

| Syntax | No. of bits | Mnemonic |
|---|---|---|
| UsacExtElementConfig( ) | | |
| { | | |
| usacExtElementType = escapedValue(4,8,16); | | |
| usacExtElementConfigLength = escapedValue(4,8,16); | | |
| usacExtElementDefaultLengthPresent; | 1 | uimsbf |
| if (usacExtElementDefaultLengthPresent) { | | |
| usacExtElementDefaultLength = escapedValue(8,16,0) + 1; | | |
| } else { | | |
| usacExtElementDefaultLength = 0; | | |
| } | | |
| usacExtElementPayloadFrag; | 1 | uimsbf |
| switch (usacExtElementType) { | | |
| case ID_EXT_ELE_FILL: | | |
| break; | | |
| case ID_EXT_ELE_MPEGS: | | |
| SpatialSpecificConfig( ); | | |
| break; | | |
| case ID_EXT_ELE_SAOC: | | |
| SaocSpecificConfig( ); | | |
| break; | | |
| case ID_EXT_ELE_AUDIOPREROLL: | | |
| /* No configuration element */ | | |
| break; | | |
| case ID_EXT_ELE_UNI_DRC: | | |
| uniDrcConfig( ); | | |
| break; | | |
| case ID_EXT_ELE_OAMD: | | |
| oamdInfo( ); | | |
| break; | | |

-continued

| Syntax | No. of bits | Mnemonic |
|---|---|---|
| default: | NOTE | |
| while (usacExtElementConfigLength−−) { | | |
| tmp; | 8 | uimsbf |
| } | | |
| break; | | |
| } | | |
| } | | |

NOTE:
The default entry for the usacExtElementType is used for unknown extElementTypes so that legacy decoders can cope with future extensions.

Example Audio System Architecture

Figure 17:
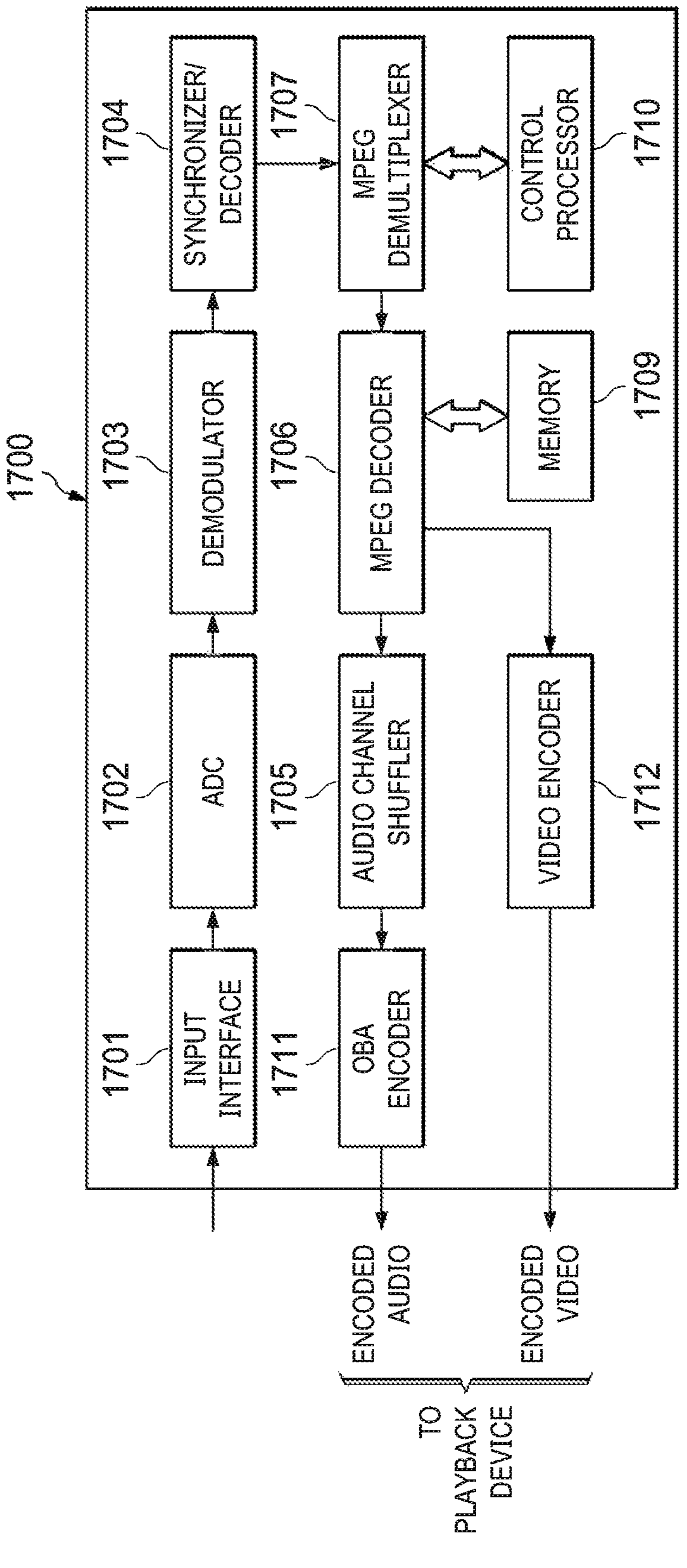
FIG. 17 is a block diagram of an example audio system architecture that includes channel audio to object audio conversion, according to an embodiment.

FIG. 17 is a block diagram of an example audio system architecture that includes channel audio to object audio conversion, according to an embodiment. In this example, the architecture is for an STB or AVR. STB/AVR 1700 includes input 1701, analog-to-digital converter (ADC) 1702, demodulator 1703, synchronizer/decoder 1704, MPEG demultiplexer 1707, MPEG decoder 1706, memory 1709, control processor 1710, audio channel shuffler 1705, OBA encoder 1711 and video encoder 1712. In this example, STB/AVR 1700 implements the applications described in FIGS. 9A-9C and 10A, 10B, where pre-computed OAMD is carried in an MPEG-4 audio bitstream In an embodiment, a low-noise block collects radio waves from a satellite dish and converts them to an analog signal that is sent through a coaxial cable to input port 1701 of STB/AVR 1700. The analog signal is converted to a digital signal by ADC 1702. The digital signal is demodulated by demodulator 1703 (e.g., QPSK demodulator) and synchronized and decoded by synchronizer/decoder 1704 (e.g., synchronizer plus Viterbi decoder) to recover the MPEG transport bitstream, which is demodulated by MPEG demultiplexer 1707 and decoded by MPEG decoder 1706 to recover channel-based audio and video audio bitstreams and metadata, including channel shuffle information and OAMD. Audio channel shuffler 1705 reorders the audio channels in accordance with the channel shuffle information, such as, for example, in conformance with principles as described in reference to FIG. 1B. OBA encoder 1711 encodes the audio with reordered channels into an OBA audio bitstream (e.g., Dolby® MAT) which is transmitted to the playback device (e.g., Dolby® Atmos® device) to be rendered by an object audio renderer in the playback device. Video encoder 1712 encodes the video into a video format that is supported by the playback device.

Note that the architecture described in reference to FIG. 17 is only an example architecture. The conversion from CBA to OBA can be performed by any device that includes one or more processors, memory, appropriate input/output interfaces, and software modules and/or hardware (e.g., ASICs) for performing the format conversion and channel reordering described herein.

While this document contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Various aspects of the present invention may be appreciated from the following enumerated example embodiments (EEEs):

EEE 1. A method comprising:

receiving, by one or more processors of an audio processing apparatus, a bitstream including channel-based audio and metadata;

the one or more processors configured to:

- parse a signaling parameter from the metadata, the signaling parameter indicating one of a plurality of different object audio metadata (OAMD) representations;
- convert the channel-based metadata into OAMD using the OAMD representation that is indicated by the signaling parameter;
- generate channel shuffle information based on channel ordering constraints of the OAMD;
- reorder the channels of the channel-based audio based on the channel shuffle information; and
- render the reordered, channel-based audio into rendered audio using the OAMD; or
- encode the channel-based audio and OAMD into an object-based audio bitstream and transmit the object-based audio bitstream to a playback device or source device.

EEE 2. The method of EEE 1, wherein the channel-based audio and metadata are included in a native audio bitstream, and the method further comprises decoding the native audio bitstream to recover the channel-based audio and metadata.

EEE 3. The method of EEE 2, wherein the native audio bitstream is an advanced audio coding (AAC) bitstream.

EEE 4. The method of any of EEEs 1-3, wherein the channel-based audio and metadata are N.M channel-based audio and metadata, where N is a positive integer greater than nine and M is a positive integer greater than or equal to zero.

EEE 5. The method of any of EEEs 1-4, wherein the source device is a television set-top box or an audio/video receiver.

EEE 6. The method of any of EEEs 1-5, further comprising:

determining a first set of channels of the channel-based audio that are capable of being represented by OAMD bed channels;

assigning OAMD bed channel labels to the first set of channels;

determining a second set of channels of the channel-based audio that are not capable of being represented by OAMD bed channels; and assigning static OAMD position coordinates to the second set of channels.

EEE 7. The method of any of EEEs 1-6, wherein the OAMD includes dimensional trim data to lower loudness levels of one or more out-of-screen audio objects in the rendered audio.

EEE 8. The method of any of EEEs 1-7, wherein the OAMD includes object gains used to compensate for differences between downmix values of the channel-based audio and rendering of OAMD representations of the channel-based audio.

EEE 9. A method comprising:

receiving, by one or more processors of an audio processing apparatus, a bitstream including channel-based audio and metadata;

the one or more processors configured to:

encode the channel-based audio into a native audio bitstream;

parse a signaling parameter from the metadata, the signaling parameter indicating one of a plurality of different object audio metadata (OAMD) representations;

convert the channel-based metadata into OAMD using the OAMD representation that is indicated by the signaling parameter;

generate channel shuffle information based on channel ordering constraints of the OAMD;

generate a bitstream package that includes the native audio bitstream, the channel shuffle information and the OAMD;

multiplex the package into a transport layer bitstream; and transmit the transport layer bitstream to a playback device or source device.

EEE 10. The method of EEE 9, wherein the native audio bitstream is an advanced audio coding (AAC) bitstream.

EEE 11. The method of EEE 9 or EEE 10, wherein the channel-based audio and metadata are N.M channel-based audio and metadata, where N is a positive integer greater than seven and M is a positive integer greater than or equal to zero.

EEE 12. The method of any of EEEs 9-11, wherein the source device is a television set-top box or an audio/video receiver.

EEE 13. The method of any of EEEs 9-12, wherein channels in the channel-based audio that can be represented by OAMD bed channel labels use the OAMD bed channel labels, and channels in the channel-based audio that cannot be represented by OAMD bed channel labels use static object positions, where each static object position is described in OAMD position coordinates.

EEE 14. The method of any of EEEs 9-13, wherein the OAMD includes dimensional trim data to lower loudness levels of one or more out-of-screen audio objects in the rendered audio.

EEE 15. The method of any of EEEs 9-14, wherein the OAMD includes object gains used to compensate for differences between downmix values of the channel-based audio and rendering of OAMD representations of the channel-based audio.

EEE 16. The method of any of EEEs 9-15, wherein the transport bitstream is a moving pictures experts group (MPEG) audio bitstream that includes a signal that indicates the presence of OAMD in an extension field of the MPEG audio bitstream.

EEE 17. The method of EEE 16, wherein the signal that indicates the presence of OAMD in the MPEG audio bitstream is included in a reserved field of metadata in the MPEG audio bitstream for signaling a surround sound mode.

EEE 18. A method comprising:

receiving, by one or more processors of an audio processing apparatus, a transport layer bitstream including a package;

the one or more processors configured to:

demultiplex the transport layer bitstream to recover the package;

decode the package to recover a native audio bitstream, channel shuffle information and an object audio metadata (OAMD);

decode the native audio bitstream to recover a channel-based audio bitstream and metadata;

reorder the channels of the channel-based audio based on the channel shuffle information; and render the reordered, channel-based audio into rendered audio using the OAMD; or encode the channel-based audio and OAMD into an object-based audio bitstream and transmit the object-based audio bitstream to a source device.

EEE 19. The method of EEE 18, wherein the native audio bitstream is an advanced audio coding (AAC) bitstream.

EEE 20. The method of EEE 18 or EEE 19, wherein the channel-based audio and metadata are N.M channel-based audio and metadata, where N is a positive integer greater than seven and M is a positive integer greater than or equal to zero.

EEE 21. The method of any of EEEs 18-20, further comprising:

determining a first set of channels of the channel-based audio that are capable of being represented by OAMD bed channels;

assigning OAMD bed channel labels to the first set of channels;

determining a second set of channels of the channel-based audio that are not capable of being represented by OAMD bed channels; and assigning static OAMD position coordinates to the second set of channels.

EEE 22. The method of any of EEEs 18-21, wherein the OAMD includes dimensional trim data to lower loudness levels of one or more out-of-screen objects in the rendered audio.

EEE 23. The method of any of EEEs 18-22, wherein the OAMD includes object gains used to compensate for differences between downmix values of the channel-based audio and rendering of OAMD representations of the channel-based audio.

EEE 24. The method of any of EEEs 18-23, wherein the transport bitstream is an moving pictures experts group (MPEG) audio bitstream that includes a signal that indicates the presence of OAMD in an extension field of the MPEG audio bitstream.

EEE 25. The method of any of EEEs 18-24, wherein the signal that indicates the presence of OAMD in the MPEG audio bitstream is included in a reserved field of a data structure in metadata of the MPEG audio bitstream for signaling a surround sound mode.

EEE 26. An apparatus comprising:

one or more processors; and a non-transitory, computer-readable storage medium having instructions stored thereon that when executed by the one or more processors, cause the one or more processors to perform the methods of any of the proceeding EEEs 1-25.

EEE 27. A non-transitory, computer-readable storage medium having instructions stored thereon that when executed by one or more processors, cause the one or more processors to perform the methods of any of the proceeding EEEs 1-25.

The invention claimed is:

1. A method comprising:

receiving, by one or more processors of an audio processing apparatus, a bitstream including channel-based audio and associated channel-based audio metadata;

the one or more processors configured to:

parse a signaling parameter from the channel-based audio metadata, the signaling parameter indicating one of a plurality of different object audio metadata (OAMD) representations, each one of the OAMD representations mapping one or more audio channels of the channel-based audio to one or more audio objects convert the channel-based metadata into OAMD associated with the one or more audio objects using the OAMD representation that is indicated by the signaling parameter;

generate channel shuffle information based on channel ordering constraints of the OAMD;

reorder the one or more audio channels of the channel-based audio based on the channel shuffle information to generate reordered, channel-based audio; and render the reordered, channel-based audio into rendered audio using the OAMD; or encode the reordered, channel-based audio and the OAMD into an object-based audio bitstream and transmit the object-based audio bitstream to a playback device or source device.

2. The method of claim 1, wherein the bitstream is a native audio bitstream, and the method further comprises decoding the native audio bitstream to determine the channel-based audio and metadata.

3. The method of claim 2, wherein the native audio bitstream is an advanced audio coding (AAC) bitstream.

4. The method of claim 1, wherein the channel-based audio and the associated channel-based audio metadata are N.M channel-based audio and channel-based audio metadata associated with the N.M channel-based audio respectively, and wherein N is a positive integer greater than nine and M is a positive integer greater than or equal to zero.

5. The method of claim 4, wherein the channel-based audio is 22.2.

6. The method of claim 1, wherein the source device is a television set-top box or an audio/video receiver.

7. The method of claim 1, further comprising:

determining a first set of channels of the channel-based audio that are capable of being represented by OAMD bed channels;

assigning OAMD bed channel labels to the first set of channels;

determining a second set of channels of the channel-based audio that are not capable of being represented by OAMD bed channels; and assigning static OAMD position coordinates to the second set of channels.

8. The method of claim 1, wherein the OAMD includes dimensional trim data to lower loudness levels of one or more out-of-screen audio objects in the rendered audio.

9. The method of claim 1, wherein the OAMD includes object gains that allow for compensation of differences between downmix values of the channel-based audio and rendering of OAMD representations of the channel-based audio.

10. A method comprising:

receiving, by one or more processors of an audio processing apparatus, a bitstream including channel-based audio and associated channel-based audio metadata;

the one or more processors configured to:

encode the channel-based audio into a native audio bitstream;

parse a signaling parameter from the channel-based audio metadata, the signaling parameter indicating one of a plurality of different object audio metadata (OAMD) representations, each one of the OAMD representations mapping one or more audio channels of the channel-based audio to one or more audio objects;

convert the channel-based metadata into OAMD associated with the one or more audio objects using the OAMD representation that is indicated by the signaling parameter;

generate channel shuffle information based on channel ordering constraints of the OAMD;

generate a bitstream package that includes the native audio bitstream, the channel shuffle information and the OAMD, the channel shuffle information enabling reordering the one or more audio channels of the channel-based audio based on the channel shuffle information at a playback device or source device to generate reordered, channel based audio;

multiplex the bitstream package into a transport layer bitstream; and transmit the transport layer bitstream to the playback device or the source device.

11. The method of claim 10, wherein the native audio bitstream is an advanced audio coding (AAC) bitstream.

12. The method of claim 10, wherein the channel-based audio and the associated channel-based audio metadata are N.M channel-based audio and channel-based audio metadata associated with the N.M channel-based audio, respectively, and wherein N is a positive integer greater than seven and M is a positive integer greater than or equal to zero.

13. The method of claim 12, wherein the channel-based audio is 22.2.

14. The method of claim 10, wherein the source device is a television set-top box or an audio/video receiver.

15. The method of claim 10, wherein channels in the channel-based audio that can be represented by OAMD bed channel labels use the OAMD bed channel labels, and channels in the channel-based audio that cannot be represented by OAMD bed channel labels use static object positions, where each static object position is described in OAMD position coordinates.

16. The method of claim 10, wherein the OAMD includes dimensional trim data to lower loudness levels of one or more out-of-screen audio objects in the rendered audio.

17. The method of claim 10, wherein the OAMD includes object gains that allow for compensation of differences between downmix values of the channel-based audio and rendering of OAMD representations of the channel-based audio.

18. The method of claim 10, wherein the transport bitstream is a moving pictures experts group (MPEG) audio bitstream that includes a signal that indicates the presence of OAMD in an extension field of the MPEG audio bitstream.

19. The method of claim 18, wherein the signal that indicates the presence of OAMD in the MPEG audio bitstream is included in a reserved field of metadata in the MPEG audio bitstream for signaling a surround sound mode.

20. A method comprising:

receiving, by one or more processors of an audio processing apparatus, a transport layer bitstream including a bitstream package, the bitstream package comprising a native audio bitstream comprising encoded channel-based audio, channel shuffle information and object audio metadata (OAMD);

the one or more processors configured to:

demultiplex the transport layer bitstream to determine the bitstream package;

decode the bitstream package to determine the channel-based audio, the channel shuffle information and the object audio metadata (OAMD);

reorder the audio channels of the channel-based audio based on the channel shuffle information to generate reordered, channel based audio; and render the reordered, channel-based audio into rendered audio using the OAMD;

or encode the reordered, channel-based audio and the OAMD into an object-based audio bitstream and transmit the object-based audio bitstream to a source device.

21. The method of claim 20, wherein the native audio bitstream is an advanced audio coding (AAC) bitstream.

22. The method of claim 20, wherein the channel-based audio is N.M channel-based audio, and wherein N is a positive integer greater than seven and M is a positive integer greater than or equal to zero.

23. The method of claim 22, wherein the channel-based audio is 22.2.

24. The method of claim 20, further comprising:

determining a first set of channels of the channel-based audio that are capable of being represented by OAMD bed channels;

assigning OAMD bed channel labels to the first set of channels;

determining a second set of channels of the channel-based audio that are not capable of being represented by OAMD bed channels; and assigning static OAMD position coordinates to the second set of channels.

25. The method of claim 20, wherein the OAMD includes dimensional trim data to lower loudness levels of one or more out-of-screen objects in the rendered audio.

26. The method of claim 20, wherein the OAMD includes object gains that allow for compensation of differences between downmix values of the channel-based audio and rendering of OAMD representations of the channel-based audio.

27. The method of claim 20, wherein the transport bitstream is an moving pictures experts group (MPEG) audio bitstream that includes a signal that indicates the presence of OAMD in an extension field of the MPEG audio bitstream.

28. The method of claim 20, wherein the signal that indicates the presence of OAMD in the MPEG audio bitstream is included in a reserved field of a data structure in metadata of the MPEG audio bitstream for signaling a surround sound mode.

29. An apparatus comprising:

one or more processors; and a non-transitory, computer-readable storage medium having instructions stored thereon that when executed by the one or more processors, cause the one or more processors to perform the method of claim 1.

30. A non-transitory, computer-readable storage medium having instructions stored thereon that when executed by one or more processors, cause the one or more processors to perform the method of claim 1.

* * * * *